(12) United States Patent
Qiu et al.

(10) Patent No.: US 8,772,396 B2
(45) Date of Patent: Jul. 8, 2014

(54) POLY(ARYLENE ETHER)—POLYOLEFIN COMPOSITION AND ITS USE IN WIRE AND CABLE INSULATION AND SHEATHING

(75) Inventors: Weili Qiu, Pudong Shanghai (CN); Xiucuo Li, Shanghai (CN); Wei Shan, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/265,925

(22) PCT Filed: Dec. 7, 2010

(86) PCT No.: PCT/CN2010/079498
§ 371 (c)(1),
(2), (4) Date: Oct. 24, 2011

(87) PCT Pub. No.: WO2012/075621
PCT Pub. Date: Jun. 14, 2012

(65) Prior Publication Data
US 2013/0261237 A1    Oct. 3, 2013

(51) Int. Cl.
*C08K 3/22* (2006.01)
*H01B 3/42* (2006.01)

(52) U.S. Cl.
USPC ............... 524/433; 524/436; 174/110 SR

(58) Field of Classification Search
USPC ................. 524/433, 436; 174/110 SR
IPC ........................ C08K 3/22; H01B 3/42
See application file for complete search history.

(56) References Cited

U.S. PATENT DOCUMENTS

| 7,332,677 | B2 | 2/2008 | Xu et al. | |
| 7,517,927 | B2* | 4/2009 | Kosaka et al. | 524/115 |
| 7,582,692 | B2 | 9/2009 | Kosaka et al. | |
| 7,772,322 | B2 | 8/2010 | Kosaka et al. | |
| 7,799,854 | B2 | 9/2010 | Kosaka et al. | |
| 7,847,032 | B2 | 12/2010 | Guo et al. | |
| 2003/0096123 | A1* | 5/2003 | Yeager | 428/461 |
| 2003/0181584 | A1 | 9/2003 | Handlin, Jr. et al. | |
| 2006/0278425 | A1* | 12/2006 | Harada et al. | 174/110 R |
| 2007/0264888 | A1* | 11/2007 | Harada et al. | 439/892 |
| 2009/0084574 | A1* | 4/2009 | Balfour et al. | 174/110 SR |
| 2012/0196973 | A1* | 8/2012 | Doshi et al. | 524/538 |

FOREIGN PATENT DOCUMENTS

| EP | 389837 | A | * | 10/1990 |
| JP | 60099162 | A | * | 6/1985 |
| KR | 747932 | B1 | * | 8/2007 |
| WO | 03047857 | A1 | | 6/2003 |
| WO | 2008076480 | A2 | | 6/2008 |
| WO | 2009042369 | A2 | | 4/2009 |

OTHER PUBLICATIONS

Japanese Abstract of JP 6099162 (Jun. 1985).*
Machine translated English equivalent of KR 747932 (Aug. 2007, 15 pages).*
International Search Report and Written Opinion for International Application No. PCT/CN2010/079498, International Filing Date Dec. 7, 2010, date of mailing Sep. 15, 2011, 16 pages.

* cited by examiner

*Primary Examiner* — Susannah Chung
*Assistant Examiner* — Brieann R Fink
(74) *Attorney, Agent, or Firm* — Cantor Colburn LLP

(57) ABSTRACT

A composition includes specific amounts of a poly(arylene ether), an unfunctionalized hydrogenated triblock copolymer, an unfunctionalized polyolefin, and magnesium dihydroxide. The composition is useful for forming insulation and sheath layers of wire and cable.

14 Claims, 2 Drawing Sheets

POLY(ARYLENE ETHER)—POLYOLEFIN COMPOSITION AND ITS USE IN WIRE AND CABLE INSULATION AND SHEATHING

CROSS REFERENCE TO RELATED APPLICATIONS

This application claims priority to Chinese application No. PCT/CN2010/079498, filed Dec. 7, 2010, the contents of which are incorporated herein by reference.

BACKGROUND OF THE INVENTION

A commonly used insulating material for insulated electrical and optical conductors is the halogenated resin, poly(vinyl chloride) (PVC). It is relatively inexpensive, widely available, flexible, and has inherent flame resistant properties. However, there is an increasing desire to reduce or eliminate the use of halogenated resins in insulating layers due to their negative impact on the environment. Many jurisdictions now mandate or are planning to mandate a decrease in the use of halogenated materials such as PVC. Therefore there is a continuing need to develop new halogen-free insulation materials.

One stringent standard for performance of insulated electrical cables is set forth in Harmonization Document HD21.14 S1, "Cables of rated voltage up to and including 450/750 V and having thermoplastic insulation. Part 14: Flexible cables (cords), insulated and sheathed with halogen-free thermoplastic compounds", May 2003. A composition comprising polyethylene and at least 60 weight percent magnesium dihydroxide meets the technical requirements of HD21.14 S1, but users have complained that insulation made from this composition is too rigid and exhibits a scratch-sensitive surface appearance, while the composition itself exhibits a relatively high density (about 1.5 gram per centimeter$^3$) and a high melt viscosity that makes it difficult to use for insulation fabrication.

Recent research has demonstrated that certain halogen-free poly(arylene ether) compositions can possess the physical and flame retardant properties needed for use as insulation in some wire and cable applications. See, for example, U.S. Patent Application Publication Nos. US 2006/0106139 A1, US 2006/0182967 A1, and US 2007/0261878 A1 of Kosaka et al., and US 2006/0131059 A1 of Xu et al. However, existing poly(arylene ether) compositions that meet the physical requirements of HD21.14 S have been challenged to meet the low-smoke requirements of that standard.

There remains a need for thermoplastic compositions satisfy the requirements of the HD21.14 S standard while exhibiting one or more improvements such as greater flexibility, reduced scratch sensitivity, reduced density, and reduced melt viscosity.

BRIEF DESCRIPTION OF THE INVENTION

One embodiment is a composition comprising: about 10 to about 35 weight percent of a poly(arylene ether); about 8 to about 15 weight percent of an unfunctionalized hydrogenated triblock copolymer of an alkenyl aromatic compound and a conjugated diene; wherein the unfunctionalized hydrogenated triblock copolymer has a weight average molecular weight less than or equal to 200,000 atomic mass units; about 15 to about 30 weight percent of an unfunctionalized polyolefin comprising about 14 to about 30 weight percent of an unfunctionalized ethylene-octene copolymer; and about 20 to about 60 weight percent of a magnesium dihydroxide; wherein all weight percents are based on the total weight of the composition.

Another embodiment is an insulated conductor, comprising: a conductor; and an insulating layer surrounding the conductor; wherein the insulating layer comprises an insulating layer composition comprising about 10 to about 35 weight percent of a poly(arylene ether); about 8 to about 15 weight percent of an unfunctionalized hydrogenated triblock copolymer of an alkenyl aromatic compound and a conjugated diene; wherein the unfunctionalized triblock copolymer has a weight average molecular weight less than or equal to 200,000 atomic mass units; about 15 to about 30 weight percent of an unfunctionalized polyolefin comprising about 14 to about 30 weight percent of an unfunctionalized ethylene-octene copolymer; and about 20 to about 60 weight percent of a magnesium dihydroxide; wherein all weight percents are based on the total weight of the insulating layer composition.

These and other embodiments are described in detail below.

BRIEF DESCRIPTION OF THE DRAWINGS

Referring now to the drawings wherein like elements are numbered alike in two FIGURES.

DETAILED DESCRIPTION OF THE INVENTION

Figure 1:
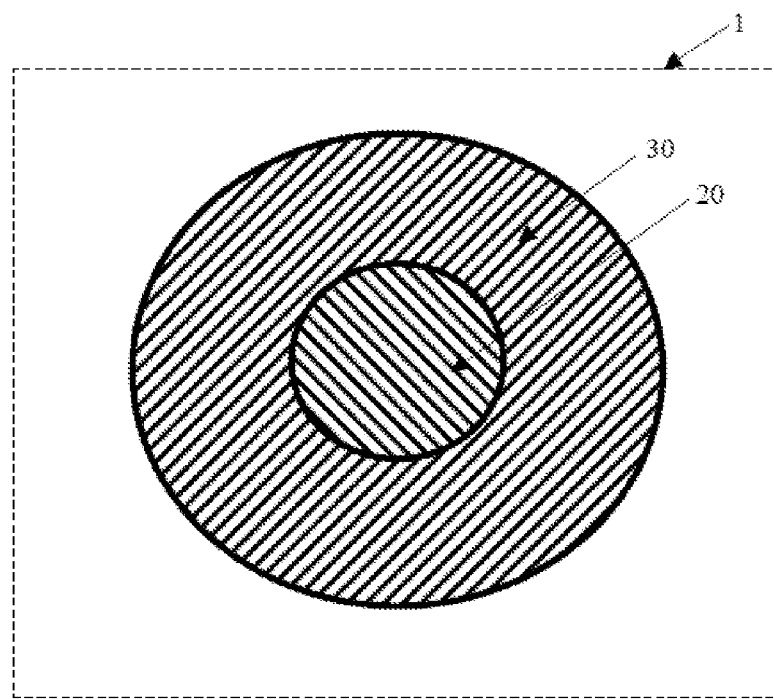
FIG. 1 is a schematic representation of a cross-section of an insulated conductor.

The present inventors have prepared thermoplastic compositions that provide an improved balance of flexibility, scratch resistance, reduced density, and reduced melt viscosity compared to previous halogen-free poly(arylene ether) compositions for wire and cable insulation.

One embodiment is a composition comprising: about 10 to about 35 weight percent of a poly(arylene ether); about 8 to about 15 weight percent of an unfunctionalized hydrogenated triblock copolymer of an alkenyl aromatic compound and a conjugated diene; wherein the unfunctionalized hydrogenated triblock copolymer has a weight average molecular weight less than or equal to 200,000 atomic mass units; about 15 to about 30 weight percent of an unfunctionalized polyolefin comprising about 14 to about 30 weight percent of an unfunctionalized ethylene-octene copolymer; and about 20 to about 60 weight percent of a magnesium dihydroxide; wherein all weight percents are based on the total weight of the composition.

The poly(arylene ether) used to form the composition comprises repeating structural units of the formula

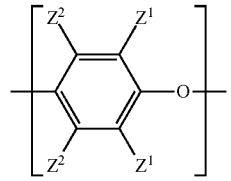

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present. In some embodiments the poly(arylene ether) comprises TMDQ end groups in an amount of less than 5 weight percent, specifically less than 3 weight percent, more specifically less than 1 weight percent, based on the weight of the poly(arylene ether). In some embodiments, the poly(arylene ether) comprises, on average, about 0.7 to about 2 moles, specifically about 1 to about 1.5 moles, of chain-terminal hydroxyl groups per mole of poly (arylene ether).

The poly(arylene ether) can be in the form of a homopolymer, a copolymer, a graft copolymer, an ionomer, or a block copolymer, as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units. In some embodiments, the poly(arylene ether) is an unfunctionalized poly(arylene ether). An unfunctionalized poly(arylene ether) is a poly(arylene ether) consisting of the polymerization product of one or more phenols. The term "unfunctionalized poly(arylene ether)" excludes functionalized poly(arylene ether)s, such as acid-functionalized poly(arylene ether)s and anhydride-functionalized poly (arylene ether)s. In some embodiments, the poly(arylene ether) comprises a poly(2,6-dimethyl-1,4-phenylene ether).

The poly(arylene ether) can be prepared by the oxidative coupling of monohydroxyaromatic compound(s) such as 2,6-xylenol and/or 2,3,6-trimethylphenol. Catalyst systems are generally employed for such coupling. They can contain heavy metal compounds such as copper, manganese, or cobalt compounds, usually in combination with one or more ligands such as a primary amine, a secondary amine, a tertiary amine, a halide, or a combination of two or more of the foregoing.

In some embodiments, the poly(arylene ether) has an intrinsic viscosity of about 0.2 to about 1.0 deciliter per gram, as measured by ubbelohde viscometer in chloroform at 25° C. In some embodiments, the poly(arylene ether) has an intrinsic viscosity of about 0.3 to about 0.6 deciliter per gram. When the poly(arylene ether) is a poly(2,6-dimethyl-1,4-phenylene ether), the intrinsic viscosity range of about 0.3 to about 0.6 deciliter per gram can correspond to a number average molecular weight range of about 16,000 to about 25,000 atomic mass units.

In some embodiments, the composition comprises less than or equal to 2 weight percent, specifically less than or equal to 1 weight percent, more specifically less than or equal to 0.5 weight percent, of a poly(arylene ether)-polysiloxane block copolymer. In some embodiments, the composition excludes poly(arylene ether)-polysiloxane block copolymer. Poly(arylene ether)-polysiloxane block copolymers, which comprise at least one poly(arylene ether) block and at least one polysiloxane block, are described, for example, in U.S. Patent Application Publication No. US 2010/0139944 A1 of Guo et al. In some embodiments, the poly(arylene ether) is characterized by a weight average molecular weight and a peak molecular weight, wherein a ratio of the weight average molecular weight to the peak molecular weight is about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(arylene ether) molecular weight of the highest point in a plot of molecular weight on the x-axis versus absorbance on the y-axis.

The amount of poly(arylene ether) used to prepare the composition is about 10 to about 35 weight percent, based on the total weight of the composition. Within this range, the poly(arylene ether) amount can be about 12 to about 30 weight percent, specifically about 14 to about 26 weight percent. In some embodiments in which the composition is a sheath layer composition, the poly(arylene ether) amount can be about 20 to about 30 weight percent, specifically about 23 to about 29 weight percent. In some embodiments in which the composition is an insulation layer composition, the poly (arylene ether) amount can be about 10 to about 20 weight percent, specifically about 12 to about 18 weight percent.

In addition to the poly(arylene ether), the composition comprises an unfunctionalized hydrogenated triblock copolymer of an alkenyl aromatic compound and a conjugated diene. In the context, the term "unfunctionalized" means that the hydrogenated triblock copolymer does not include the residue of any functionalizing agents or any monomers other than the alkenyl aromatic compound and the conjugated diene. In some embodiments, the unfunctionalized hydrogenated triblock copolymer consists of carbon and hydrogen atoms and therefore excludes heteroatoms.

The alkenyl aromatic monomer used to prepare the unfunctionalized hydrogenated triblock copolymer can have the structure

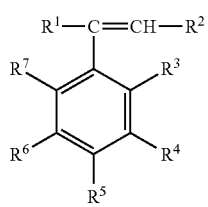

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$-$R^6$ each independently represent a hydrogen atom, a $C_1$-$C_8$ alkyl group, or a $C_2$-$C_8$ alkenyl group; or $R^3$ and $R^4$ are taken together with the central aromatic ring to form a naphthyl group, or $R^4$ and $R^5$ are taken together with the central aromatic ring to form a naphthyl group. Specific alkenyl aromatic monomers include, for example, styrene, chlorostyrenes such as p-chlorostyrene, and methylstyrenes such as alpha-methylstyrene and p-methylstyrene. In some embodiments, the alkenyl aromatic monomer is styrene. In some embodiments, the poly(alkenyl aromatic) content of the hydrogenated triblock copolymer is about 10 to about 40 weight percent, specifically about 20 to about 40 weight percent, based on the weight of the unfunctionalized hydrogenated triblock copolymer. In other embodiments, the poly(alkenyl aromatic) content of the hydrogenated triblock copolymer is about 40 to about 75 weight percent, specifically about 55 to about 75 weight percent, based on the weight of the unfunctionalized hydrogenated triblock copolymer.

The conjugated diene used to prepare the unfunctionalized hydrogenated triblock copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The unfunctionalized hydrogenated triblock copolymer is a copolymer having an A-B-A triblock structure in which the "A" blocks are the same or different and derived from an alkenyl aromatic monomer and the "B" block is derived from a conjugated diene and the aliphatic unsaturated group content of the "B" block has been reduced by hydrogenation. The term "triblock copolymer" includes tapered triblock copolymers. Method of preparing tapered triblock copolymers, which may also be referred to as controlled distribution triblock copolymers, are described, for example, in U.S. Patent Application No. US 2003/181584 A1 of Handlin et al. In some embodiments, the unfunctionalized hydrogenated triblock copolymer comprises a "B" block that comprises random incorporation of alkenyl aromatic monomer. In some embodiments, the unfunctionalized hydrogenated triblock copolymer comprises a polystyrene-poly(ethylene-butylene)-polystyrene triblock copolymer.

The unfunctionalized hydrogenated triblock copolymer has a weight average molecular weight less than or equal to 200,000 atomic mass units. In some embodiments, the weight average molecular weight is about 80,000 to 200,000 atomic mass units, specifically about 100,000 to about 150,000 atomic mass units, more specifically about 110,000 to about 130,000 atomic mass units. As demonstrated in the working examples below, the use of an unfunctionalized hydrogenated triblock copolymer having a weight average molecular weight less than or equal to 200,000 atomic mass units is unexpectedly associated with increased tensile strength.

Methods of preparing unfunctionalized hydrogenated triblock copolymers are known in the art and many unfunctionalized hydrogenated triblock copolymers are commercially available. Illustrative commercially available unfunctionalized hydrogenated triblock copolymers include the polystyrene-poly(ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as Kraton RP-6935 and RP-6936; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P 1000 and P2000; and the polystyrene-poly(ethylene-butylene)-polystyrene triblock copolymer comprising about 60 weight polystyrene available from Kuraray as SEPTON 58104. Mixtures of two of more unfunctionalized hydrogenated triblock copolymers can be used.

In some embodiments, the unfunctionalized hydrogenated triblock copolymer comprises a polystyrene-poly(ethylene-butylene)-polystyrene triblock copolymer.

The composition comprises the unfunctionalized hydrogenated triblock copolymer in an amount of about 8 to about 15 weight percent, based on the total weight of the composition. Within this range, the amount of unfunctionalized hydrogenated triblock copolymer can be about 9 to about 14 weight percent, specifically about 9.5 to about 13 weight percent, more specifically about 9.5 to about 12 weight percent. In some embodiments in which the composition is a sheath layer composition, the unfunctionalized hydrogenated block copolymer amount can be about 9 to about 15 weight percent, specifically about 10 to about 14 weight percent. In some embodiments in which the composition is an insulation layer composition, the unfunctionalized hydrogenated triblock copolymer amount can be about 8 to about 13 weight percent, specifically about 8 to about 12 weight percent.

In addition to the poly(arylene ether) and the unfunctionalized hydrogenated triblock copolymer, the composition comprises an unfunctionalized polyolefin. In this context, the term "unfunctionalized" means that the polyolefin does not include the residue of any functionalizing agents or any monomers other than olefin monomers. In some embodiments, the unfunctionalized polyolefin consists of carbon and hydrogen atoms and therefore excludes heteroatoms. In general, polyolefins are homopolymers or copolymers of $C_2$-$C_{12}$ alkenes. Suitable polyolefins include, for example, high density polyethylenes, medium density polyethylenes, low density polyethylenes, linear low density polyethylenes, polypropylenes (propylene homopolymers), propylene random copolymers, propylene graft copolymers, and propylene block copolymers. The unfunctionalized polyolefin comprises an unfunctionalized ethylene-octene copolymer. In this context, the term "unfunctionalized" means that the ethylene-octene copolymer consists of the residue of ethylene and octene monomers. In some embodiments, the unfunctionalized ethylene-octene copolymer comprises a 1-octene content of about 5 to about 35 weight percent, specifically about 7 to about 31 weight percent, more specifically about 9 to about 27 weight percent.

In some embodiments, the unfunctionalized polyolefin further comprises one or more copolymers of ethylene and a $C_3$-$C_7$ or $C_9$-$C_{12}$ alpha-olefin.

In some embodiments, the unfunctionalized polyolefin comprises a polybutene. When present, the polybutene can be used in an amount of about 1 to about 10 weight percent, specifically about 2 to about 8 weight percent, more specifically about 3 to about 6 weight percent, based on the total weight of the composition.

In some embodiments, the unfunctionalized polyolefin comprises a linear low density polyethylene. When present, the linear low density polyethylene can be used in an amount of about 0.5 to about 6 weight percent, specifically about 1 to about 5 weight percent, more specifically about 2 to about 4 weight percent, based on the total weight of the composition.

In some embodiments, the unfunctionalized polyolefin comprises polybutene in an amount of about 1 to about 10 weight percent, specifically about 2 to about 8 weight percent, more specifically about 3 to about 6 weight percent, based on the total weight of the composition; and linear low density polyethylene in an amount of about 0.5 to about 6 weight percent, specifically about 1 to about 5 weight percent, more specifically about 2 to about 4 weight percent, based on the total weight of the composition.

In some embodiments, the unfunctionalized polyolefin consists of the unfunctionalized ethylene-octene copolymer and, optionally, one or more polyolefins selected from the group consisting of polybutenes and linear low density polyethylenes.

Methods of forming polyolefins are known, and a wide variety of polyolefins is commercially available. Suitable polyolefins include, for example, the copolymers of ethylene and 1-octene available as EXACT 8210 and EXACT 8201 from DEXPOLYMERS; the polybutene available as INDOPOL HSO from BP Chemical; and the linear low density polyethylene available as NUC-G5381 from Nippon Unicar Company Limited.

In some embodiments, the composition comprises less than or equal to 1 weight percent of (or excludes) an ethylene homopolymer.

In some embodiments, the composition comprises less than or equal to 1 weight percent of (or excludes) a propylene homopolymer.

The composition comprises the unfunctionalized polyolefin in an amount of about 15 to about 30 weight percent, specifically about 17 to about 28 weight percent, more specifically about 19 to about 27 weight percent, based on the total weight of the composition. The unfunctionalized ethylene-octene copolymer is present in an amount of about 14 to about 30 weight percent, specifically about 15 to about 25 weight percent, more specifically about 16 to about 20 weight percent, based on the total weight of the composition.

In addition to the unfunctionalized polyolefin, the composition can, optionally, further comprise an acid-functionalized polyolefin, an acid-functionalized hydrogenated block copolymer of an alkenyl aromatic compound and a conjugated diene, or a combination thereof. In this context, the term "acid-functionalized" includes functionalization with carboxylic acids and carboxylic acid anhydrides.

The polyolefin content of the acid-functionalized polyolefin can include any of the polyolefins described above in the context of the unfunctionalized polyolefin. The acid-functionalization can be derived, for example, from maleic acid, fumaric acid, maleic anhydride, or a combination thereof. Suitable acid-functionalized polyolefins include, for example, maleic anhydride-functionalized ethylene-octene copolymer, and maleic anhydride-functionalized polypropylene. Methods for forming acid-functionalized polyolefins are known in the art and include, for example, those described in U.S. Pat. No. 6,914,097 B2 of Ward et al. Suitable acid-functionalized polyolefins are also commercially available as, for example, the maleic anhydride-functionalized copolymer of ethylene and 1-octene available as FUSABOND N493 from DuPont, and the maleic anhydride-functionalized polypropylene available as EXXELOR PO 1020 from ExxonMobil Chemical Co.

The hydrogenated block copolymer content of the acid-functionalized hydrogenated block copolymer of an alkenyl aromatic compound and a conjugated diene can be any of the hydrogenated triblock copolymers described above in the context of the unfunctionalized hydrogenated triblock copolymer and can further include diblock, tetrablock, pentablock, and higher order hydrogenated multi-block copolymers. The acid-functionalization can be derived, for example, from maleic acid, fumaric acid, maleic anhydride, or a combination thereof. Methods of forming acid-functionalized hydrogenated block copolymers are known in the art. Suitable acid-functionalized hydrogenated block copolymers are also commercially available as, for example, the maleic anhydride-grafted polystyrene-poly(ethylene-butylene)-polystyrene triblock copolymers available from Kraton Polymers as Kraton G1901, G1924, and MD-6684; and the maleic anhydride-grafted polystyrene-poly(ethylene-butylene-styrene)-polystyrene triblock copolymer available from Kraton Polymers as Kraton MD-6670.

In some embodiments, the composition comprises the acid-functionalized polyolefin. In some embodiments, the acid-functionalized polyolefin comprises a maleic anhydride-functionalized ethylene-octene copolymer.

When present, the acid-functionalized polyolefin, acid-functionalized hydrogenated block copolymer, or combination thereof can be used in an amount of about 2 to about 8 weight percent, specifically about 3 to about 7 weight percent, more specifically about 4 to about 6 weight percent, based on the total weight of the composition.

In addition to the poly(arylene ether), the unfunctionalized hydrogenated triblock copolymer, and the unfunctionalized polyolefin, the composition comprises a magnesium dihydroxide. The magnesium dihydroxide (CAS Reg. No. 1309-42-8) can have a median particle size of about 0.01 to about 15 micrometers, more specifically, less than or equal to 10 micrometers, or, even more specifically, less than or equal to 5 micrometers. The magnesium dihydroxide can be synthetic or natural. Exemplary natural magnesium dihydroxides include MAGSEEDS N1, N2, and N3 from Konoshima Chemical Co. Ltd. The magnesium dihydroxide can, optionally, be surface treated. Exemplary surface treatments include fatty acids, siloxane compounds (including amino polysiloxanes), polymeric coupling agents, and combinations thereof. In some embodiments, the magnesium dihydroxide comprises an acid-treated magnesium dihydroxide, an amino polysiloxane-treated magnesium dihydroxide, or a combination thereof.

Magnesium dihydroxides are commercially available as, for example, MAGNIFIN H-5 IV and H-5 MV from Albemarle Corporation; KISUMA 5A from Kisuma Chemicals; MGZ-1 and MGZ-3 from Sakai Chemicals; and MAG-SHIELD S and UF from Martin Marietta Magnesia Specialties.

The composition comprises the magnesium dihydroxide in an amount of about 20 to about 60 weight percent, specifically about 24 to about 56 weight percent, more specifically about 28 to about 52 weight percent, yet more specifically about 32 to about 52 weight percent, even more specifically about 36 to about 52 weight percent, still more specifically about 42 to about 52 weight percent, and even more specifically about 44 to about 52 weight percent, based on the total weight of the composition.

In some embodiments, the composition comprises about 20 to about 40 weight percent, specifically about 25 to about 35 weight percent, of the magnesium dihydroxide.

In some embodiments, the composition comprises about 40 to about 60 weight percent, specifically about 45 to about 55 weight percent, of the magnesium dihydroxide.

In some embodiments, the composition comprises about 43 to about 60 weight percent, specifically about 44 to about 56 weight percent, more specifically about 45 to about 52 weight percent, even more specifically about 46 to about 52 weight percent of the magnesium dihydroxide, based on the total weight of the composition.

In some embodiments in which the composition is an insulation layer composition, the magnesium dihydroxide can comprise an acid-treated magnesium dihydroxide, and the magnesium dihydroxide amount can be about 40 to about 60 weight percent, specifically about 45 to about 55 weight percent, based on the total weight of the composition.

In some embodiments in which the composition is a sheath layer composition, the magnesium dihydroxide can comprise an amino polysiloxane-treated magnesium dihydroxide, and the magnesium dihydroxide amount can be about 20 to about 40 weight percent, specifically about 25 to about 35 weight percent, based on the total weight of the composition.

In some embodiments, the composition further comprises a homopolystyrene, a rubber-modified polystyrene, or a combination thereof in an amount of up to about 10 weight percent, based on the total weight of the composition.

In some embodiments, the composition comprises less than or equal to 1 weight percent of any polymer other than the poly(arylene ether), the unfunctionalized hydrogenated triblock copolymer, the unfunctionalized polyolefin, and the acid-functionalized polyolefin. For example, the composition can comprise less than 1 weight percent of (or entirely exclude) polystyrenes (including homopolystyrenes and rubber-modified polystyrenes), polyamides, and/or polyesters.

In some embodiments, the composition further comprises erucamide. When present, the erucamide can be used in an amount of about 0.2 to about 3 weight percent, specifically about 0.3 to about 2 weight percent, even more specifically about 0.4 to about 1 weight percent, based on the total weight of the composition.

In some embodiments, the composition comprises less than or equal to 5 weight percent, based on the total weight of the composition, of any flame retardant other than the magnesium dihydroxide. The amount of any other such flame retardants can be less than or equal to 3 weight percent, less than or equal to 1 weight percent, less than or equal to 0.5 weight percent, or less than or equal to 0.1 weight percent. In some embodiments, the composition excludes any flame retardant other than the magnesium dihydroxide. Flame retardants other than magnesium dihydroxide include, for example, brominated polymers (such as brominated polystyrene), metal oxides (e.g., antimony trioxide), metal dialkyl phosphinates (such as aluminum tris(diethylphosphinate)), aromatic phosphate esters (such as resorcinol bis(diphenyl phosphate) and bisphenol A bis(diphenyl phosphate)), melamine salts (such as melamine cyanurate, melamine phosphate, melamine pyrophosphate, and melamine polyphosphate), metal borate salts (such as zinc borate), and metal hydroxides other than magnesium dihydroxide (such as aluminum trihydroxide).

In some embodiments, the composition is substantially free of phosphorus. The term "substantially free", in this context, is defined as containing less than or equal to 0.5 weight percent phosphorus, more specifically less than or equal to 0.2 weight percent phosphorus, with respect to the total weight of the composition.

In some embodiments, the composition is substantially free of halogens. The term "substantially free", in this context, is defined as containing less than or equal to 0.2 weight percent halogen, or, more specifically less than or equal to 0.05 weight percent with respect to the total weight of the composition.

In some embodiments, the composition is substantially free of phosphorus and halogens.

A specific embodiment of the composition, especially suitable for use as a sheath layer composition, comprises about 20 to about 30 weight percent of the poly(arylene ether); about 8 to about 16 weight percent of the unfunctionalized hydrogenated triblock copolymer; about 22 to about 31 weight percent of the unfunctionalized polyolefin, wherein the unfunctionalized polyolefin comprises about 15 to about 22 weight percent of the unfunctionalized ethylene-octene copolymer; and about 25 to about 35 weight percent of the magnesium dihydroxide. In the sheath layer composition composition, the unfunctionalized polyolefin can, optionally, further comprise about 3 to about 7 weight percent of a polybutene and about 1.5 to about 4.5 weight percent of a linear low density polyethylene. The sheath layer composition can, optionally, further comprise about 3 to about 7 weight percent of an acid-functionalized polyolefin, wherein the acid-functionalized polyolefin comprises a maleic anhydride-functionalized ethylene-octene copolymer. In the sheath layer composition, the magnesium dihydroxide can, optionally, comprise an amino polysiloxane-treated magnesium dihydroxide.

A specific embodiment of the composition, especially suitable for use as an insulation layer composition, comprises about 10 to about 20 weight percent of the poly(arylene ether); about 8 to about 13 weight percent of the unfunctionalized hydrogenated triblock copolymer; about 15 to about 25 weight percent of the unfunctionalized polyolefin, wherein the unfunctionalized polyolefin comprises about 14 to about 21 weight percent of the unfunctionalized ethylene-octene copolymer; about 43 to about 56 weight percent of the magnesium dihydroxide. In the insulation layer composition, wherein the unfunctionalized polyolefin can, optionally, further comprise about 1.5 to about 4.5 weight percent of a linear low density polyethylene. The insulation layer composition can, optionally, further comprise about 3 to about 7 weight percent of an acid-functionalized polyolefin; wherein the acid-functionalized polyolefin comprises a maleic anhydride-functionalized ethylene-octene copolymer. In the insulation layer composition, the magnesium dihydroxide can, optionally, comprise a stearic acid-treated magnesium dihydroxide.

One embodiment is an insulated conductor comprising a conductor and an insulating layer surrounding the conductor. FIG. 1 is a schematic representation of a cross-section of an insulated conductor 1 comprising a conductor 20 and an insulating layer 30.

A conductor may comprise aluminum or alloy comprising aluminum, or a cladded conductor comprising aluminum or an alloy comprising aluminum. In some embodiments, the coated conductor comprising copper or an alloy comprising copper, or a cladded conductor comprising copper or an alloy comprising copper. Use of optical conductors is also contemplated.

In some embodiments, the conductor is solid conductor, or a round strand or compressed or compact stranded conductor essentially meeting or exceeding the performance requirements set forth by UL 83 (revised in 2008), or UL 44 (revised in 2008), or UL 854 (revised in 2007), or ISO 6722 (as of second edition, 2006-08-01), or ISO 14572 (as of second edition, 2006-11-15), or ASTM B256-02 (revised in 2002), or ASTM B800-05 (revised in 2005), or ASTM B566-04a (revised in 2004), or ASTM B609M-04 (revised in 2004) and UL1581 (revised in 2008).

In some embodiments, the conductor is a solid conductor, or round strand or compressed or compact stranded conductor essentially meeting or exceeding the test method requirements set forth by UL 1581 (revised in 2008), or UL 2556 (revised in 2007) or ISO 6722 (as of second edition, 2006-08-01) and or ASTM B258-2

In some embodiments, the conductor may comprise a single conductor, a single strand, a plurality of single conductors, or a plurality of strands or a combination thereof. In some embodiments, a plurality of single conductor, or a plurality of strands may be bundled, twisted, or braided to form a conductor. The single individual conductor used in making up a stranded conductor is either drawn to the same diameter or to a different diameter than the other strands and need not have the diameter of any American Wire Gauge (AWG) or other standard gauge number. Additionally, the conductor may have various cross-sectional shapes such as round, oval, square, oblong, or trapezoidal.

The conductor can have a cross-section that meets at least one of following: (i) an AWG of AWG 56 to AWG 26, (ii) a nominal cross-section area of 0.000122 to 0.128 square millimeters (corresponding to AWG 56 to AWG 26 according to ASTM B256-02); (iii) a nominal diameter from 0.0124 to 0.404 millimeters (corresponding to AWG 56 to AWG 26 according to UL 1581, 4th edition, Table 20.1). The covering of the covered conductor can have a thickness of 0.010 to 0.85 millimeters.

In some embodiments, the conductor has a cross-section that has an AWG number from AWG 56 to AWG 26. Within this range, the conductor may have a cross-section of AWG number greater than or equal to AWG 30, or, more specifically greater than or equal to AWG 35. Also within this range, the conductor may have a cross-section of AWG number less than or equal to AWG 50, or, more specifically, less than or equal to AWG 45.

In some embodiments, the conductor has a nominal cross-section area of 0.000122 to 0.128 square millimeters (corresponding to AWG 56 to AWG 26 according to ASTM B256-02). Within this range, the conductor can have a nominal cross-section greater than or equal to area of 0.000497 square millimeters (AWG 50 according to ASTM B256-02), or, more specifically greater than or equal to 0.00487 square millimeters (AWG 40, according to ASTM B256-02). Also within this range, the conductor may have a nominal cross-section area less than or equal to 0.0507 square millimeters (AWG 30, according to ASTM B256-02), or, more specifically, less than or equal 0.0159 square millimeters (AWG 35, according to ASTM B256-02).

In some embodiments, the conductor has a nominal diameter of 0.0124 to 0.404 millimeter (corresponding to AWG 56 to AWG 26, according to UL 1581, 4th edition, Table 20.1). Within this range, the conductor can have a nominal diameter greater than or equal to area of 0.0251 millimeter (AWG 50 according to UL 1581, 4th edition, Table 20.1), or, more specifically greater than or equal to 0.0447 millimeter (AWG 40, according to UL 1581, 4th edition, Table 20.1). Also within this range, the conductor may have a nominal diameter less than or equal to 0.254 millimeter (AWG 30 according to UL 1581, 4th edition, Table 20.1), or, more specifically, less than or equal 0.142 millimeter (AWG 35, according to UL 1581, 4th edition, Table 20.1). The maximum and minimum range for the nominal diameter according to UL 1581, 4th edition, Table 20.1 would also apply herein.

In some embodiments, the conductor has a cross-section that meets at least one of following: (i) AWG of AWG 24 to AWG 5, (ii) a cross-section area of 0.205 to 16.8 square millimeters (corresponding to AWG 24 to AWG 5 according to ASTM B256-02); (iii) a nominal diameter of 0.511 to 4.62 millimeter (corresponding to AWG 24 to AWG 5 according to UL 1581, 4th edition, Table 20.1). In some embodiments, the covering of the covered conductor has a thickness of 0.25 to 8 millimeter.

In some embodiments, the conductor has a cross-section that has an AWG number from AWG 24 to AWG 5. Within this range, the conductor can have a cross-section of AWG number greater than or equal to AWG 10, or, more specifically greater than or equal to AWG 12. Also within this range, the conductor may have a cross-section of AWG number less than or equal to AWG 20, or, more specifically, less than or equal to AWG 15.

In some embodiments, the conductor has a nominal cross-section area of 0.205 to 16.8 square millimeters (corresponding to AWG 24 to AWG 5 according to ASTM B256-02). Within this range, the conductor can have a nominal cross-section greater than or equal to area of 0.52 square millimeters (AWG 20 according to ASTM B256-02), or, more specifically greater than or equal to 1.65 square millimeters (AWG 15, according to ASTM B256-02). Also within this range, the conductor can have a nominal cross-section area less than or equal to 5.26 square millimeters (AWG 10, according to ASTM B256-02), or, more specifically, less than or equal 3.31 square millimeters (AWG 12, according to ASTM B256-02).

In some embodiments, the conductor has a nominal diameter of 0.511 to 4.62 millimeters (corresponding to AWG 24 to AWG 5, according to UL 1581, 4th edition, Table 20.1). Within this range, the conductor can have a nominal diameter greater than or equal to area of 0.813 millimeter (AWG 20 according to UL 1581, 4th edition, Table 20.1), or, more specifically greater than or equal to 1.45 millimeters (AWG 15, according to UL 1581, 4th edition, Table 20.1). Also within this range, the conductor can have a nominal diameter less than or equal to 2.588 millimeters (AWG 10 according to UL 1581, 4th edition, Table 20.1), or, more specifically, less than or equal 2.05 millimeters (AWG 12, according to UL 1581, 4th edition, Table 20.1). The maximum and minimum range for the nominal diameter according to UL 1581, 4th edition, Table 20.1 can also apply herein.

The thickness of the insulation layer is not particularly limited, and smaller thicknesses may be preferable for efficiency. Although the thickness of the insulation layer depends on the diameter of the conductor, the thickness of the covering is typically about 0.01 to about 8.0 millimeters.

In some embodiments, the insulation layer has a thickness of about 0.010 to about 0.85 millimeters. Within this range, the thickness can be greater than or equal to 0.100 millimeter, specifically greater than or equal to 0.250 millimeter. Also within this range, the thickness can be less than or equal to 0.60 millimeter, specifically less than or equal to 0.50 millimeter.

In some embodiments the insulating layer has a thickness of about 0.25 to about 8 millimeters. Within this range, the thickness can be greater than or equal to 0.5 millimeter, specifically greater than or equal to 1.5 millimeters. Also within this range, the thickness can be less than or equal to 5 millimeters, specifically less than or equal to 3 millimeters.

The insulating layer comprises an insulating layer composition comprising poly(arylene ether) in an amount of about 10 to about 35 weight percent, specifically about 12 to about 30 weight percent, more specifically about 14 to about 26 weight percent; an unfunctionalized hydrogenated triblock copolymer of an alkenyl aromatic compound and a conjugated diene, the unfunctionalized hydrogenated triblock copolymer being present in an amount of about 8 to about 16 weight percent, specifically about 9 to about 15 weight percent, more specifically about 9.5 to about 14 weight percent, even more specifically about 9.5 to about 13 weight percent; wherein the unfunctionalized hydrogenated triblock copolymer has a weight average molecular weight less than or equal to 200,000 atomic mass units, specifically about 80,000 to 200,000 atomic mass units, more specifically about 100,000 to about 150,000 atomic mass units, even more specifically about 110,000 to about 130,000 atomic mass units; an unfunctionalized polyolefin in an amount of about 15 to about 30 weight percent, specifically about 17 to about 28 weight percent, more specifically about 19 to about 27 weight percent, wherein the unfunctionalized polyolefin comprises an unfunctionalized ethylene-octene copolymer in an amount of about 14 to about 30 weight percent, specifically about 15 to about 25 weight percent, more specifically about 16 to about 20 weight percent; and a magnesium dihydroxide in an amount of about 20 to about 60 weight percent, specifically about 24 to about 56 weight percent, more specifically about 28 to about 52 weight percent; wherein all weight percents are based on the total weight of the composition. In some embodiments, the insulating layer composition further comprises an acid-functionalized polyolefin, an acid-functionalized hydrogenated block copolymer of an alkenyl aromatic compound and a conjugated diene, or a combination thereof, in an amount of about 2 to about 8 weight percent, specifically about 3 to about 7 weight percent, more specifically about 4 to about 6 weight percent, based on the total weight of the composition.

Figure 2:
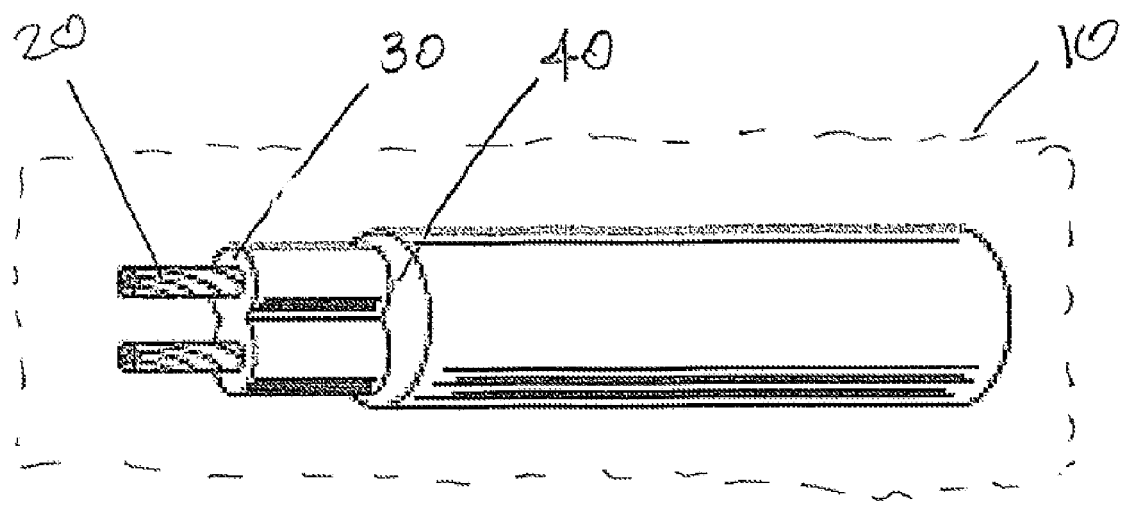
FIG. 2 is a schematic representation of a section of cable with two conductors, an insulating layer, and a sheath layer.

In some embodiments, the insulated conductor is a cable that further comprises a sheath layer surrounding the insulating layer. FIG. 2 is a schematic representation of a cable 10 comprising two conductors 20, each conductor surrounded by an insulating layer 30, which in turn is surrounded by a sheath layer 40. A specific example of a cable comprising two conductors, an insulating layer, and a sheath layer is an H03Z1Z1H2-F cable ("H03 cable", for brevity), which is described in detail in Harmonization Document HD21.14 S1, "Cables of rated voltage up to and including 450/750 V and having thermoplastic insulation. Part 14: Flexible cables (cords), insulated and sheathed with halogen-free thermoplastic compounds", May 2003. Using the insulation layer composition and sheath layer composition described herein, it has been possible to prepare H03 cable that satisfies the physical requirements of the HD21.14 S1 standard, passes the flammability test of IEC 60332-1-1 (2004-07), and achieves a light transmittance of at least 40%, specifically 50%, more specifically 60% in the smoke density test of value of IEC 60332-1-1 (2004-07).

In some embodiments, the sheath layer has a thickness of about 0.01 to about 8 millimeters, specifically about 0.02 to about 2 millimeters, more specifically about 0.03 to about 1.2 millimeters.

In some embodiments where the cable comprises two or more insulated conductors. In some of these embodiments, the two or more conductors are each surrounded by an insulation layer that is continuous between the conductors. In others of these embodiments, each of the two or more conductors is surrounded by an insulation layer, and the insulation layer of any given insulated conductor can be in physical contact with the insulation layer(s) of one or more adjacent insulated conductors. In others of these embodiments, each of the two or more conductors is surrounded by an insulation layer, and the insulation layer of any given insulated conductor is not in physical contact with the insulation layer(s) of any other insulated conductors. One or more of the insulated conductors can, optionally, be separated from any adjacent insulated conductor by a portion of sheath layer.

The sheath layer can comprise a sheath layer composition comprising a poly(arylene ether) in an amount of about 10 to about 35 weight percent, specifically about 12 to about 30 weight percent, more specifically about 14 to about 26 weight percent; an unfunctionalized hydrogenated triblock copolymer of an alkenyl aromatic compound and a conjugated diene, wherein the unfunctionalized hydrogenated triblock copolymer is present in an amount of about 8 to about 16 weight percent, specifically about 9 to about 15 weight percent, more specifically about 9.5 to about 14 weight percent, even more specifically about 9.5 to about 13 weight percent; wherein the unfunctionalized hydrogenated triblock copolymer has a weight average molecular weight less than or equal to 200,000 atomic mass units, specifically about 80,000 to 200,000 atomic mass unit, more specifically about 100,000 to about 150,000 atomic mass unit, even more specifically about 110,000 to about 130,000 atomic mass units; an unfunctionalized polyolefin in an amount of about 15 to about 30 weight percent, specifically about 17 to about 28 weight percent, more specifically about 19 to about 27 weight percent; wherein the unfunctionalized polyolefin comprises an unfunctionalized ethylene-octene copolymer in an amount of about 14 to about 30 weight percent, specifically about 15 to about 25 weight percent, more specifically about 16 to about 20 weight percent; and a magnesium dihydroxide in an amount of about 40 to about 60 weight percent, specifically about 45 to about 55 weight percent; wherein all weight percents are based on the total weight of the composition. It will be understood that the similarly named components can be the same or different in the insulating layer and the sheath layer. For example, the poly(arylene ether) used in the insulating layer can be the same as or different from the poly(arylene ether) used in the sheath layer.

In some embodiments, the sheath layer composition further comprises an acid-functionalized polyolefin, an acid-functionalized hydrogenated block copolymer of an alkenyl aromatic compound and a conjugated diene, or a combination thereof in an amount of about 2 to about 8 weight percent, specifically about 3 to about 7 weight percent, more specifically about 4 to about 6 weight percent.

In some embodiments of the insulated conductor comprising an insulating layer and a sheath layer, the insulating layer composition comprises the magnesium dihydroxide in an amount of about 20 to about 40 weight percent, specifically about 25 to about 35 weight percent.

In some embodiments of the insulated conductor comprising an insulating layer and a sheath layer, the insulating layer composition comprises about 10 to about 20 weight percent of the poly(arylene ether); about 8 to about 13 weight percent of the unfunctionalized hydrogenated triblock copolymer; about 15 to about 25 weight percent of the unfunctionalized polyolefin, wherein the unfunctionalized polyolefin comprises about 14 to about 21 weight percent of the unfunctionalized ethylene-octene copolymer; and about 43 to about 56 weight percent of the magnesium dihydroxide. In some embodiments, the unfunctionalized polyolefin further comprises about 1.5 to about 4.5 weight percent of a linear low density polyethylene. In some embodiments, the insulating layer composition further comprises about 3 to about 7 weight percent of an acid-functionalized polyolefin, wherein the acid-functionalized polyolefin comprises a maleic anhydride-functionalized ethylene-octene copolymer. In some embodiments, the magnesium dihydroxide of the insulating layer composition comprises a stearic acid-treated magnesium dihydroxide.

In some embodiments of the insulated conductor comprising an insulating layer and a sheath layer, the sheath layer composition comprises about 20 to about 30 weight percent of the poly(arylene ether); about 9 to about 15 weight percent of the unfunctionalized hydrogenated triblock copolymer; wherein the unfunctionalized hydrogenated triblock copolymer has a weight average molecular weight less than or equal to 200,000 atomic mass units, specifically about 80,000 to 200,000 atomic mass unit, more specifically about 100,000 to about 150,000 atomic mass unit, even more specifically about 110,000 to about 130,000 atomic mass units; about 22 to about 31 weight percent of the unfunctionalized polyolefin; wherein the unfunctionalized polyolefin comprises about 15 to about 22 weight percent of the unfunctionalized ethylene-octene copolymer; and about 25 to about 35 weight percent of the magnesium dihydroxide.

In some embodiments, the unfunctionalized polyolefin of the sheath layer composition comprises about 3 to about 7 weight percent of a polybutene and about 1.5 to about 4.5 weight percent of a linear low density polyethylene.

In some embodiments, the sheath layer composition further comprises about 3 to about 7 weight percent of an acid-functionalized polyolefin, wherein the acid-functionalized polyolefin comprises a maleic anhydride-functionalized ethylene-octene copolymer.

In some embodiments, the magnesium dihydroxide of the sheath layer composition comprises an amino polysiloxane-treated magnesium dihydroxide.

In a specific embodiment of the insulated conductor comprising an insulating layer and a sheath layer, the insulating layer composition comprises
   about 10 to about 20 weight percent of the poly(arylene ether);
   about 8 to about 13 weight percent of the unfunctionalized hydrogenated triblock copolymer;
   about 15 to about 25 weight percent of the unfunctionalized polyolefin; wherein the
   unfunctionalized polyolefin comprises about 14 to about 21 weight percent of the
   unfunctionalized ethylene-octene copolymer; and
   about 43 to about 56 weight percent of the magnesium dihydroxide; and
the sheath layer composition comprises
   about 20 to about 30 weight percent of the poly(arylene ether);
   about 9 to about 15 weight percent of the unfunctionalized hydrogenated triblock copolymer;
   about 22 to about 31 weight percent of the unfunctionalized polyolefin; wherein the
   unfunctionalized polyolefin comprises about 15 to about 22 weight percent of the
   unfunctionalized ethylene-octene copolymer; and
   about 25 to about 35 weight percent of the magnesium dihydroxide.

In some embodiments, the unfunctionalized polyolefin of the insulating layer composition further comprises about 1.5 to about 4.5 weight percent of a linear low density polyethylene.

In some embodiments, the insulating layer composition further comprises about 3 to about 7 weight percent of and acid-functionalized polyolefin comprising a maleic anhydride-functionalized ethylene-octene copolymer.

In some embodiments, the magnesium dihydroxide of the insulating layer composition comprises a stearic acid-treated magnesium dihydroxide.

In some embodiments, the unfunctionalized polyolefin of the sheath layer composition further comprises about 3 to about 7 weight percent of a polybutene and about 1.5 to about 4.5 weight percent of a linear low density polyethylene.

In some embodiments, the sheath layer composition further comprises about 3 to about 7 weight percent of an acid-functionalized polyolefin; wherein the acid-functionalized polyolefin comprises a maleic anhydride-functionalized ethylene-octene copolymer.

In some embodiments, the magnesium dihydroxide of the sheath layer composition comprises an amino polysiloxane-treated magnesium dihydroxide.

The invention includes at least the following embodiments.

Embodiment 1

A composition comprising: about 10 to about 35 weight percent of a poly(arylene ether); about 8 to about 16 weight percent of an unfunctionalized hydrogenated triblock copolymer of an alkenyl aromatic compound and a conjugated diene; wherein the unfunctionalized hydrogenated triblock copolymer has a weight average molecular weight less than or equal to 200,000 atomic mass units; about 15 to about 30 weight percent of an unfunctionalized polyolefin comprising about 14 to about 30 weight percent of an unfunctionalized ethylene-octene copolymer; and about 20 to about 60 weight percent of a magnesium dihydroxide; wherein all weight percents are based on the total weight of the composition.

Embodiment 2

The composition of embodiment 1, further comprising about 2 to about 8 weight percent of an acid-functionalized polyolefin, an acid-functionalized hydrogenated block copolymer of an alkenyl aromatic compound and a conjugated diene, or a combination thereof.

Embodiment 3

The composition of embodiment 2, comprising the acid-functionalized polyolefin.

Embodiment 4

The composition of embodiment 3, wherein the acid-functionalized polyolefin comprises a maleic anhydride-functionalized ethylene-octene copolymer.

Embodiment 5

The composition of any of embodiments 1-4, wherein the unfunctionalized hydrogenated triblock copolymer comprises a polystyrene-poly(ethylene-butylene)-polystyrene triblock copolymer.

Embodiment 6

The composition of any of embodiments 1-5, wherein the unfunctionalized ethylene-octene copolymer comprises a 1-octene content of about 5 to about 35 weight percent.

Embodiment 7

The composition of any of embodiments 1-6, wherein the unfunctionalized polyolefin further comprises about 1 to about 10 weight percent of a polybutene.

Embodiment 8

The composition of any of embodiment 1-6, wherein the unfunctionalized polyolefin further comprises about 0.5 to about 6 weight percent of a linear low density polyethylene.

Embodiment 9

The composition of any of embodiments 1-6, wherein the unfunctionalized polyolefin further comprises about 1 to about 10 weight percent of a polybutene and about 0.5 to about 6 weight percent of a linear low density polyethylene.

Embodiment 10

The composition of any of embodiments 1-9, wherein the unfunctionalized polyolefin consists of the unfunctionalized ethylene-octene copolymer and, optionally, one or more polyolefins selected from the group consisting of polybutenes and linear low density polyethylenes.

Embodiment 11

The composition of any of embodiments 1-10, comprising less than or equal to 1 weight percent of an ethylene homopolymer.

Embodiment 12

The composition of any of embodiments 1-11, comprising less than or equal to 1 weight percent of a propylene homopolymer.

Embodiment 13

The composition of any of embodiments 1-12, wherein the magnesium dihydroxide comprises a surface-treated magnesium dihydroxide.

Embodiment 14

The composition of any of embodiment 13, wherein the surface-treated magnesium dihydroxide comprises an acid-treated magnesium dihydroxide, an amino polysiloxane-treated magnesium dihydroxide, or a combination thereof.

Embodiment 15

The composition of any of embodiments 1-14, comprising about 20 to about 40 weight percent of the magnesium dihydroxide.

Embodiment 16

The composition of any of embodiments 1-14, comprising about 40 to about 60 weight percent of the magnesium dihydroxide.

Embodiment 17

The composition of any of embodiments 1-14 and 16, comprising about 43 to about 60 weight percent of the magnesium dihydroxide.

Embodiment 18

The composition of any of embodiments 1-17, further comprising about 0.2 to about 3 weight percent of erucamide.

Embodiment 19

The composition of any of embodiments 1-18, comprising less than or equal to 5 weight percent of any flame retardant other than the magnesium dihydroxide.

Embodiment 20

The composition of any of embodiments 1-15, 18, and 19, comprising about 20 to about 30 weight percent of the poly(arylene ether); about 8 to about 16 weight percent of the unfunctionalized hydrogenated triblock copolymer; about 22 to about 31 weight percent of the unfunctionalized polyolefin; wherein the unfunctionalized polyolefin comprises about 15 to about 22 weight percent of the unfunctionalized ethylene-octene copolymer; and about 25 to about 35 weight percent of the magnesium dihydroxide.

Embodiment 21

The composition of embodiment 20, wherein the unfunctionalized polyolefin further comprises about 3 to about 7 weight percent of a polybutene and about 1.5 to about 4.5 weight percent of a linear low density polyethylene.

Embodiment 22

The composition of embodiment 20 or 21, further comprising about 3 to about 7 weight percent of an acid-functionalized polyolefin; wherein the acid-functionalized polyolefin comprises a maleic anhydride-functionalized ethylene-octene copolymer.

Embodiment 23

The composition of any of embodiments 20-22, wherein the magnesium dihydroxide comprises an amino polysiloxane-treated magnesium dihydroxide.

Embodiment 24

The composition of any of embodiments 1-14 and 16-19, comprising about 10 to about 20 weight percent of the poly(arylene ether); about 8 to about 13 weight percent of the unfunctionalized hydrogenated triblock copolymer; about 15 to about 25 weight percent of the unfunctionalized polyolefin; wherein the unfunctionalized polyolefin comprises about 14 to about 21 weight percent of the unfunctionalized ethylene-octene copolymer; and about 43 to about 56 weight percent of the magnesium dihydroxide.

Embodiment 25

The composition of embodiment 24, wherein the unfunctionalized polyolefin further comprises about 1.5 to about 4.5 weight percent of a linear low density polyethylene.

Embodiment 26

The composition of embodiment 24 or 25, further comprising about 3 to about 7 weight percent of an acid-functionalized polyolefin; wherein the acid-functionalized polyolefin comprises a maleic anhydride-functionalized ethylene-octene copolymer.

Embodiment 27

The composition of any of embodiments 24-26, wherein the magnesium dihydroxide comprises a stearic acid-treated magnesium dihydroxide.

Embodiment 28

An insulated conductor, comprising: a conductor; and an insulating layer surrounding the conductor; wherein the insulating layer comprises an insulating layer composition comprising about 10 to about 35 weight percent of a poly(arylene ether); about 8 to about 16 weight percent of an unfunctionalized hydrogenated triblock copolymer of an alkenyl aromatic compound and a conjugated diene; wherein the unfunctionalized hydrogenated triblock copolymer has a weight average molecular weight less than or equal to 200,000 atomic mass units; about 15 to about 30 weight percent of an unfunctionalized polyolefin comprising about 14 to about 30 weight percent of an unfunctionalized ethylene-octene copolymer; and about 20 to about 60 weight percent of a magnesium dihydroxide; wherein all weight percents are based on the total weight of the insulating layer composition.

Embodiment 29

The insulated conductor of embodiment 28, wherein the insulating layer composition further comprises about 2 to about 8 weight percent of an acid-functionalized polyolefin, an acid-functionalized hydrogenated block copolymer of an alkenyl aromatic compound and a conjugated diene, or a combination thereof.

Embodiment 30

The insulated conductor of embodiment 28 or 29, further comprising a sheath layer surrounding the insulating layer, wherein the sheath layer comprising a sheath layer composition comprising about 10 to about 35 weight percent of a poly(arylene ether); about 8 to about 16 weight percent of an unfunctionalized hydrogenated triblock copolymer of an alkenyl aromatic compound and a conjugated diene; wherein the unfunctionalized hydrogenated triblock copolymer has a weight average molecular weight less than or equal to 200,000 atomic mass units; about 15 to about 30 weight percent of an unfunctionalized polyolefin comprising about 14 to about 30 weight percent of an unfunctionalized ethylene-octene copolymer; and about 40 to about 60 weight percent of a magnesium dihydroxide; wherein all weight percents are based on the total weight of the sheath layer composition.

Embodiment 31

The insulated conductor of embodiment 30, wherein the sheath layer composition further comprises about 2 to about 8 weight percent of an acid-functionalized polyolefin, an acid-functionalized hydrogenated block copolymer of an alkenyl aromatic compound and a conjugated diene, or a combination thereof.

Embodiment 32

The insulated conductor of embodiment 30 or 31, wherein the insulating layer composition comprises about 20 to about 40 weight percent of the magnesium dihydroxide.

Embodiment 33

The insulated conductor of any of embodiments 30-32, wherein the insulating layer composition comprises about 10 to about 20 weight percent of the poly(arylene ether); about 8 to about 13 weight percent of the unfunctionalized hydrogenated triblock copolymer; about 15 to about 25 weight percent of the unfunctionalized polyolefin; wherein the unfunctionalized polyolefin comprises about 14 to about 21 weight percent of the unfunctionalized ethylene-octene copolymer; and about 43 to about 56 weight percent of the magnesium dihydroxide.

Embodiment 34

The insulated conductor of embodiment 33, wherein the unfunctionalized polyolefin of the insulating layer composition further comprises about 1.5 to about 4.5 weight percent of a linear low density polyethylene.

Embodiment 35

The insulated conductor of embodiment 33 or 34, wherein the insulating layer composition further comprises about 3 to about 7 weight percent of an acid-functionalized polyolefin; wherein the acid-functionalized polyolefin comprises a maleic anhydride-functionalized ethylene-octene copolymer.

Embodiment 36

The insulated conductor of any of embodiments 33-35, wherein the magnesium dihydroxide of the insulating layer composition comprises a stearic acid-treated magnesium dihydroxide.

Embodiment 37

The insulated conductor of any of embodiments 30-32, wherein the sheath layer composition comprises about 20 to about 30 weight percent of the poly(arylene ether); about 9 to about 15 weight percent of the unfunctionalized hydrogenated triblock copolymer; wherein the unfunctionalized hydrogenated triblock copolymer has a weight average molecular weight less than or equal to 200,000 atomic mass units; about 22 to about 31 weight percent of the unfunctionalized polyolefin; wherein the unfunctionalized polyolefin comprises about 15 to about 22 weight percent of an unfunctionalized ethylene-octene copolymer; and about 25 to about 35 weight percent of the magnesium dihydroxide.

Embodiment 38

The insulated conductor of embodiment 37, wherein the unfunctionalized polyolefin of the sheath layer composition further comprises about 3 to about 7 weight percent of a polybutene and about 1.5 to about 4.5 weight percent of a linear low density polyethylene.

Embodiment 39

The insulated conductor of embodiment 37 or 38, wherein the sheath layer composition further comprises about 3 to about 7 weight percent of an acid-functionalized polyolefin; wherein the acid-functionalized polyolefin comprises a maleic anhydride-functionalized ethylene-octene copolymer.

Embodiment 40

The insulated conductor of any of embodiments 37-39, wherein the magnesium dihydroxide of the sheath layer composition comprises an amino polysiloxane-treated magnesium dihydroxide.

Embodiment 41

The insulated conductor of embodiment 30, wherein the insulating layer composition comprises about 10 to about 20 weight percent of the poly(arylene ether); about 8 to about 13 weight percent of the unfunctionalized hydrogenated triblock copolymer; about 15 to about 25 weight percent of the unfunctionalized polyolefin; wherein the unfunctionalized polyolefin comprises about 14 to about 21 weight percent of the unfunctionalized ethylene-octene copolymer; and about 43 to about 56 weight percent of the magnesium dihydroxide; and wherein the sheath layer composition comprises about 20 to about 30 weight percent of the poly(arylene ether); about 9 to about 15 weight percent of the unfunctionalized hydrogenated triblock copolymer; wherein the unfunctionalized hydrogenated triblock copolymer has a weight average molecular weight less than or equal to 200,000 atomic mass units; about 22 to about 31 weight percent of an unfunctionalized polyolefin; wherein the unfunctionalized polyolefin comprises about 15 to about 22 weight percent of an unfunctionalized ethylene-octene copolymer; and about 25 to about 35 weight percent of the magnesium dihydroxide.

Embodiment 42

The insulated conductor of embodiment 41, wherein the unfunctionalized polyolefin of the insulating layer composition further comprises about 1.5 to about 4.5 weight percent of a linear low density polyethylene.

Embodiment 43

The insulated conductor of embodiment 41 or 42, wherein the insulating layer composition further comprises about 3 to about 7 weight percent of an acid-functionalized polyolefin comprising a maleic anhydride-functionalized ethylene-octene copolymer.

Embodiment 44

The insulated conductor of any of embodiments 41-43, wherein the magnesium dihydroxide of the insulating layer composition comprises a stearic acid-treated magnesium dihydroxide.

Embodiment 45

The insulated conductor of any of embodiments 41-44, wherein the unfunctionalized polyolefin of the sheath layer composition further comprises about 3 to about 7 weight percent of a polybutene and about 1.5 to about 4.5 weight percent of a linear low density polyethylene.

Embodiment 46

The insulated conductor of any of embodiments 41-45, wherein the sheath layer composition further comprises about 3 to about 7 weight percent of an acid-functionalized polyolefin; wherein the acid-functionalized polyolefin comprises a maleic anhydride-functionalized ethylene-octene copolymer.

Embodiment 47

The insulated conductor of any of embodiments 41-46, wherein the magnesium dihydroxide of the sheath layer composition comprises an amino polysiloxane-treated magnesium dihydroxide.

The invention is further illustrated by the following non-limiting examples.

Examples 1-20

These examples related to compositions and insulated conductors comprising the compositions in an insulation layer.

Components used to prepare the compositions are summarized in Table 1.

TABLE 1

| Component | Description |
| --- | --- |
| PPE, 0.46 IV | Poly(2,6-dimethyl-1,4-phenylene ether), CAS Reg. No. 25134-01-4, having an intrinsic viscosity of 0.46 deciliter per gram measured in chloroform at 25° C.; obtained in powder form as PPO 646 from SABIC Innovative Plastics |
| PPE, 0.40 IV | Poly(2,6-dimethyl-1,4-phenylene ether), CAS Reg. No. 25134-01-4, having an intrinsic viscosity of 0.40 deciliter per gram measured in chloroform at 25° C.; obtained in powder form as PPO 640 from SABIC Innovative Plastics |
| SEBS 1641 | Polystyrene-poly(ethylene-butylene)-polystyrene triblock copolymer, CAS Reg. No. 66070-58-4, having a polystyrene content of 33%, a high molecular weight, and no melt mass-flow rate measured according to ASTM D1238 at 230° C. and 5 kilogram load; obtained in powder form as KRATON G1641 from Kraton Polymers Ltd. |
| SEBS 1650 | Polystyrene-poly(ethylene-butylene)-polystyrene triblock copolymer, CAS Reg. No. 66070-58-4, having a polystyrene content of 30%, a weight average molecular weight of about 117,000, and a melt mass-flow rate less than 1 gram per 10 minutes measured according to ASTM D1238 at 230° C. and 5 kilogram load; obtained in powder form as KRATON G1650 from Kraton Polymers Ltd. |

TABLE 1-continued

| Component | Description |
|---|---|
| SEBS 1651 | Polystyrene-poly(ethylene-butylene)-polystyrene triblock copolymer, CAS Reg. No. 66070-58-4, having a polystyrene content of 33%, a weight average molecular weight of about 240,000-300,000, and no melt mass-flow measured according to ASTM D1238 at 230° C. and 5 kilogram load; obtained in powder form as KRATON G1651 from Kraton Polymers Ltd. |
| SEBS 1726 | A mixture of about 70 weight percent polystyrene-poly(ethylene-butylene) diblock copolymer and about 30 weight percent polystyrene-poly(ethylene-butylene)-polystyrene triblock copolymer, the mixture having a polystyrene content of about 30%, and a melt mass-flow rate of 15-23 grams per 10 minutes measured according to ASTM D1238 at 190° C. and 2.16 kilogram load; obtained in pellet form as KRATON G1726 from Kraton Polymers Ltd. |
| POE 8210 | Copolymer of ethylene and 1-octene, CAS Reg. No. 26221-73-8, having a melt flow rate of about 10 decigrams per minute measured according to ISO 1133 at 190° C. and a load of 2.16 kilograms; obtained in pellet form as EXACT 8210 from DEXPOLYMERS. |
| POE 8201 | Copolymer of ethylene and 1-octene, CAS Reg. No. 26221-73-8, having a melt flow rate of about 1.1 decigrams per minute measured according to ISO 1133 at 190° C. and a load of 2.16 kilograms; obtained in pellet form as EXACT 8201 from DEXPOLYMERS. |
| Polybutene | Polybutene having a number average molecular weight of about 800, a polydispersity index of about 1.6, and a viscosity of about 100-115 centistokes at a temperature of 100° C., obtained in liquid form as INDOPOL H50 from BP Chemical. |
| EVA | Ethylene-vinyl acetate copolymer, CAS Reg. No. 24937-78-8, with a vinyl acetate content of about 17-19 weight percent and a melt index of about 135-175 grams per 10 minutes measured at 190° C. and 2.16 kilogram load according to ASTM D1238, obtained in pellet form as EVATANE 18-150 from Atofina PETROCHEMICALS. |
| EAA | Ethylene-ethyl acrylate copolymer, CAS Reg. No. 9010-86-0, having an ethyl acrylate content of about 23 weight percent, obtained in pellet form as NUC-6510 from Nippon Unicar Company Limited. |
| LLDPE | Linear low density polyethylene, obtained as NUC-G5381 from Nippon Unicar Company Limited. |
| POE-MA | Maleic anhydride-functionalized copolymer of ethylene and 1-octene having a density of about 0.87 gram per milliliter measured according to D792, a melt flow rate of about 1.6 grams per 10 minutes, measured at 190° C. and 2.16 kilogram load according to ASTM D1238, obtained in pellet form as FUSABOND N493 from DuPont. |
| PP-MA | Maleic anhydride-functionalized polypropylene, CAS Reg. No. 25722-45-6, have a density of about 0.90 gram per centimeter$^3$, and a melt mass-flow rate of 110 gram per 10 minutes measured at 190° C. and 1.2 kilogram load according to ASTM D123, obtained in pellet form as EXXELOR PO 1020 from ExxonMobil Chemical Co. |
| SEBS-MA | Maleic anhydride-functionalized polystyrene-poly(ethylene-butylene)-polystyrene triblock copolymer, CAS Reg. No. 124578-11-6, having a bound maleic anhydride content of about 1.4 to 2.0 weight percent, and a melt flow of about 14 to 28 grams per 10 minutes, measured at 230° C. and 5 kilogram load according to ASTM D1238, obtained in pellet form as KRATON FG1901 from Kraton Polymers Ltd. |
| $Mg(OH)_2$ 5A | Magnesium dihydroxide surface treated with about 3 weight percent stearic acid, obtained in powder form as KISUMA 5A from Kisuma Chemicals. |
| $Mg(OH)_2$ H5IV | Magnesium dihydroxide surface treated with an amino polysiloxane, obtained in powder form as MAGNIFIN H-5 IV from Albemarle. |
| $Mg(OH)_2$ H5MV | Magnesium dihydroxide surface treated with a proprietary agent, obtained in powder form as MAGNIFIN H-5 MV from Albemarle. |
| Antioxidants | A powdered mixture of octadecyl-3-(3,5-di-tert-butyl-4-hydroxyphenyl)-propionate, CAS Reg. No. 2082-79-3 obtained as IRGANOX 1076 from CIBA; tetrakis(2,4-di-tert-butylphenyl)-1,1-biphenyl-4,4'-diylbisphosphonite, obtained as HOSTANOX P-EPQ from Clariant; and 2',3-bis[[3-[3,5-di-tert-butyl-4-hydroxyphenyl]]propionyl]]propionohydrazide, CAS Reg. No. 32687-78-8. obtained as IRGANOX MD1024 from CIBA. |
| Erucamide | Erucamide, CAS Reg. No. 112-84-5, obtained in powder form. |
| Aminosilicone | Amino-functionalized polysiloxane having a viscosity of 10-50 centistokes at 25° C., obtained in liquid form as SF 1706 from Momentive. |
| TMPS | Trimethylphenylsilsesquioxane, CAS Reg. No. 73559-47-4, obtained in liquid form as DC 8008 from Dow Corning. |
| PHTS | Phenyl-terminated, hydroxy-terminated silsesquioxane, CAS Reg. No.181186-39-0, available as Dow Corning 217 Flake Resin from Dow Corning. |
| Zinc borate | Zinc borate 3.5 hydrate, CAS Reg. No. 138265-88-0, obtained in powder form as FIREBRAKE ZB from U.S. Borax Inc. |
| Nanoclay/LLDPE masterbatch | A 50 weight percent masterbatch of nanoclay in linear low density polyethylene, obtained in pellet form as nanoMax-PE from Nanocor. |

TABLE 1-continued

| Component | Description |
|---|---|
| Ca montanate | Calcium montanate, obtained in granulate form as LICOMONT CaV 102 from Clariant. |
| Partially saponified montanate esters | Partially saponified montanate esters, obtained in powder form as LICOWAX OP from Clariant. |
| Montanate esters | Esters of montanic acids with multifunctional alcohols, obtained in flake form as LICOMONT ET 141 from Clariant. |
| PE wax | Low molecular weight polyethylene wax, obtained in solid form as HIWAX 110P from Mitsui. |
| Carbon black | Carbon black having a bulk density of about 320 grams/liter, obtained in powder form as MONARCH 800 from Cabot Specialty Chemicals Inc. |

Compositions were prepared according to the following general procedure. Components in pellet form were dry-blended with each other. Components in powder form, as well as components in liquid and flake form, were dry-blended with each other. The extruder was a Toshiba 2 lobe TEM-37BS. All components were fed upstream with a powder feeder and pellets feeder. The compounding temperature was 240° C. The screw speed was 45° rotations per minute, and the throughput was 35 kilograms/hour.

Physical test articles were injection molded using a NISSEI ES3000-25E injection molding machine with the injected thermoplastic material having an initial temperature of about 260° C. and the mold having a temperature of about 40° C. The mold dimensions were specified according to the corresponding ASTM test procedure.

Wire and cable samples were also prepared. The samples were prepared using a WTL EXL50 extrusion coating machine. The wire used an American Wire Gauge (AWG) 18 copper conductor having a diameter of 1.02 millimeter and an insulation outer diameter of 3.4 millimeters. The wire (without pre-heating) was extrusion coated with thermoplastic composition at a temperature of 245° C. The cable was a HO3Z1Z1H2-F cable (for brevity, "H03 cable") having two AWG 18 copper conductors, an insulation outer diameter of 2.25 millimeters, and sheath outer dimensions of 3.6 millimeters (minimum cross-section) and 5.8 millimeters (maximum cross-section). A diagram of HO3Z1Z1H2-F cable is presented as FIG. 2. In FIG. 2, a segment of cable 10 comprises two conductive wires 20, each surrounded by insulation 30, which is itself surrounded by sheath 40. Insulation and sheath layers of the cable were coextruded, each at 245° C.

Physical testing was conducted as summarized in Table 2.

TABLE 2

| Property | Standard | Conditions |
|---|---|---|
| Melt mass-flow rate | ASTM D1238-10 | 250° C., 10 kilogram load, 300 second dwell time |
| Flexural modulus | ASTM D790-10 | 23° C., 6.4 millimeter sample thickness, 12.5 millimeter/minute test speed |
| Tensile strength at break, tensile elongation at break | ASTM D638-10 | 23° C., 50 millimeter/minute test speed |
| Durometer hardness | ASTM D2240-05 (2010) | Type A ("Shore A"), 23° C., 6.4 millimeter sample thickness, 30 second time to read |
| Specific gravity | ASTM D792-08 | 23° C. |
| Flammability | UL 94 Vertical Burn Test | — |
| Smoke density | ASTM E662-09 | plaque size 76 millimeters × 76 millimeters × 3 millimeters; reported values are averages of maximum smoke density, DsMx, for three plaques |

Insulated conductor testing was conducted as summarized in Table 3. Surface appearance was judged visually and by touching with a fingertip.

TABLE 3

| Property | Standard, conditions |
|---|---|
| Tensile strength of insulation and sheath | EN 60811-1-1 (before aging) and EN 60811-1-2 (after aging), 250 millimeter/minute test speed. |
| Flammability | IEC 60332-1-1 (2004-07), Single vertical burn. |
| Smoke emission of H03 cable | IEC 61034-1, edition 3.0 |

Data for three compositions differing in magnesium dihydroxide type are presented in Table 4. The "(I)" following the Example numbers in Table 4 means that the examples are inventive. All three samples meet the HD21.14 standards for wire tensile strength, tensile elongation, tensile strength after aging, tensile elongation after aging, and flammability. Example 3 exhibits the best surface properties in that the surface is white, smooth, and not sticky, and the surface does not exhibit white marks when scratched.

TABLE 4

| | Ex. 1 (I) | Ex. 2 (I) | Ex. 3 (I) |
|---|---|---|---|
| | COMPOSITIONS | | |
| PPE, 0.46 IV | 30 | 30 | 30 |
| SEBS G1650 | 10 | 10 | 10 |
| POE 8210 | 18 | 18 | 18 |
| POE 8201 | 5 | 5 | 5 |

TABLE 4-continued

|  | Ex. 1 (I) | Ex. 2 (I) | Ex. 3 (I) |
|---|---|---|---|
| Polybutene | 5 | 5 | 5 |
| POE-MA | 5 | 5 | 5 |
| Mg(OH)$_2$ 5A | 27 | 0 | 0 |
| Mg(OH)$_2$ H5MV | 0 | 27 | 0 |
| Mg(OH)$_2$ H5IV | 0 | 0 | 27 |
| Antioxidants | 1.1 | 1.1 | 1.1 |
| Erucamide | 0.2 | 0.2 | 0.2 |
| TEST SAMPLE PROPERTIES | | | |
| Melt mass-flow rate (g/10 min) | 12.6 | 10.2 | 12.3 |
| Flexural modulus (MPa) | 56 | 48 | 46 |
| Shore A hardness | 90 | 89 | 89 |
| Tensile strength at break (MPa) | 9.8 | 10.4 | 11.2 |
| Tensile elongation at break (%) | 181 | 200 | 166 |
| Specific gravity (g/cm$^3$) | 1.13 | — | 1.14 |
| Smoke Density, ASTM E662-09 | 177 | 149 | 254 |
| WIRE PROPERTIES | | | |
| Tensile Strength (MPa) | 14.6 | 13.7 | 13.7 |
| Tensile Elongation (%) | 238 | 243 | 215 |
| Tensile strength after aging (MPa) | 14.6 | — | 16.1 |
| Tensile Elongation after aging (%) | 210 | — | 193 |
| Flammability, IEC60322-1-1 | Pass | Pass | Pass |
| Burning time after 60 sec fire application (sec) | 40 | 59 | 18 |
| Distance A | 232 | 163 | 225 |
| Distance B | 490 | 490 | 490 |
| Surface Appearance | Yellow, Smooth | Yellow, Sticky | White, Smooth |
| Scratch Whitening | No | Yes | No |

Data for five compositions differing primarily in unfunctionalized polyolefin type are presented in Table 5. Where Example numbers are followed by "(I)" they are inventive; when followed by "(C)" comparative. Inventive Example 4, using an ethylene-octene copolymer as the unfunctionalized polyolefin, meets the HD21.14 standards for wire tensile strength, tensile elongation, tensile strength after aging, tensile elongation after aging, and flammability. Example 4 also exhibits desirable surface properties. Comparative Examples 5 and 6, using an ethylene-vinyl acetate copolymer as unfunctionalized polyolefin, exhibit excessive smoke density and inadequate tensile elongation. Comparative Examples 7 and 8, using an ethylene-ethyl acrylate copolymer as unfunctionalized polyolefin, exhibit inadequate melt flow.

TABLE 5

|  | Ex. 4 (I) | Ex. 5 (C) | Ex. 6 (C) | Ex. 7 (C) | Ex. 8 (C) |
|---|---|---|---|---|---|
| COMPOSITIONS | | | | | |
| PPE, 0.46 IV | 30 | 28 | 28 | 28 | 28 |
| SEBS G1650 | 10 | 12 | 12 | 12 | 12 |
| POE 8210 | 18 | 0 | 0 | 0 | 0 |
| POE 8201 | 5 | 0 | 0 | 0 | 0 |
| EVA | 0 | 20 | 20 | 0 | 0 |
| EAA | 0 | 0 | 0 | 20 | 20 |
| Polybutene | 5 | 5 | 5 | 5 | 5 |
| POE-MA | 5 | 5 | 5 | 5 | 5 |
| Mg(OH)$_2$ 5A | 0 | 30 | 0 | 30 | 0 |
| Mg(OH)$_2$ H5IV | 27 | 0 | 0 | 0 | 30 |
| Antioxidants | 1.1 | 1.1 | 1.1 | 1.1 | 1.1 |
| Erucamide | 0.2 | 0.5 | 0.5 | 0.5 | 0.5 |
| TEST SAMPLE PROPERTIES | | | | | |
| Melt mass-flow rate (g/10 min) | 12.3 | 30 | 23 | 3.6 | 6.4 |
| Flexural modulus (MPa) | 46 | 48 | 35 | 92 | 57 |
| Shore A hardness | 89 | 88 | 86 | 92 | 90 |
| Tensile strength at break (MPa) | 11.2 | 7 | 6.4 | 10.3 | 12.2 |
| Tensile elongation at break (%) | 166 | 82 | 83 | 71 | 136 |
| Smoke Density, ASTM E662-09 | 254 | 327 | 231 | 191 | 169 |
| WIRE PROPERTIES | | | | | |
| Tensile Strength (MPa) | 13.7 | 10.3 | 10.4 | 17.5 | 18.9 |
| Tensile Elongation (%) | 215 | 139 | 121 | 163 | 182 |
| Tensile strength after aging (MPa) | 16.1 | 12.6 | 12.6 | 18.7 | 19.9 |
| Tensile Elongation after aging (%) | 193 | 131 | 109 | 152 | 166 |
| Flammability, IEC60322-1-1 | Pass | Pass | Pass | Pass | Pass |
| Burning time after 60 sec fire application (sec) | 18 | 19 | 20 | 67 | 34 |
| Distance A | 225 | 270 | 257 | 127 | 267 |
| Distance B | 490 | 490 | 490 | 487 | 488 |

Data for six compositions differing in the types and amounts of magnesium dihydroxide as well as in the types and amounts of auxiliary flame retardants are presented in Table 6. All samples exhibit good test sample (molded part) properties, and most of the wire properties are acceptable as well. However, the use of silicone-based additives in Examples 10-12, zinc borate in Example 13, and nanoclay/LLDPE masterbatch in Example 14 were associated with a degradation of smoke properties.

TABLE 6

| | Ex. 9 (I) | Ex. 10 (I) | Ex. 11 (I) | Ex. 12 (I) | Ex. 13 (I) | Ex. 14 (I) |
|---|---|---|---|---|---|---|
| COMPOSITIONS | | | | | | |
| PPE, 0.46 IV | 28 | 28 | 28 | 28 | 30 | 30 |
| SEBS G1650 | 12 | 12 | 12 | 12 | 10 | 10 |
| POE 8210 | 20 | 20 | 20 | 20 | 18 | 18 |
| POE 8201 | 0 | 0 | 0 | 0 | 5 | 5 |
| Polybutene | 5 | 5 | 5 | 5 | 5 | 5 |
| POE-MA | 5 | 5 | 5 | 5 | 5 | 5 |
| Mg(OH)$_2$ 5A | 0 | 0 | 0 | 0 | 22 | 22 |
| Mg(OH)$_2$ H5IV | 30 | 30 | 30 | 30 | 0 | 0 |
| Aminosilicone | 0 | 3 | 0 | 0 | 0 | 0 |
| TMPS | 0 | 0 | 3 | 0 | 0 | 0 |
| PHTS | 0 | 0 | 0 | 2 | 0 | 0 |
| Zinc borate | 0 | 0 | 0 | 0 | 5 | 0 |
| Nanoclay/LLDPE masterbatch | 0 | 0 | 0 | 0 | 0 | 5 |
| Antioxidants | 1.1 | 1.1 | 1.1 | 1.1 | 1.1 | 1.1 |
| Erucamide | 0.5 | 0.5 | 0.5 | 0.5 | 0.5 | 0.5 |
| TEST SAMPLE PROPERTIES | | | | | | |
| Melt mass-flow rate (g/10 min) | 7.2 | 9.8 | 12.9 | 10.5 | 6.8 | 7.9 |
| Flexural modulus (MPa) | 40 | 51 | 40 | 50 | 73 | 69 |
| Shore A hardness | 88 | 88 | 87 | 88 | 92 | 90 |
| Tensile strength at break (MPa) | 11.9 | 9 | 11 | 11.5 | 10.9 | 9.5 |
| Tensile elongation at break (%) | 200 | 109 | 170 | 153 | 211 | 176 |
| Smoke Density, ASTM E662-09 | 188 | 235 | 275 | 214 | 254 | 251 |
| WIRE PROPERTIES | | | | | | |
| Tensile Strength (MPa) | — | 14.9 | 16.7 | 16.8 | 15.7 | 13.3 |
| Tensile Elongation (%) | — | 222 | 214 | 207 | 201 | 187 |
| Tensile strength after aging (MPa) | — | — | — | — | 15.7 | 14.9 |
| Tensile Elongation after aging (%) | — | — | — | — | 185 | 213 |
| Flammability, IEC60322-1-1 | — | Pass | Pass | Pass | Pass | Fail |
| Burning time after 60 sec fire application (sec) | — | 3.7 | 8.7 | 19.7 | 12 | (burn clamp) |
| Distance A | — | 310 | 303 | 313 | 297 | (burn clamp) |
| Distance B | — | 483 | 483 | 483 | 490 | 490 |

Data for six compositions differing in lubricant type are presented in Table 7. All samples exhibit desirable physical, flammability, and smoke properties.

TABLE 7

| | Ex. 15 (I) | Ex. 16 (I) | Ex. 17 (I) | Ex. 18 (I) | Ex. 19 (I) | Ex. 20 (I) |
|---|---|---|---|---|---|---|
| COMPOSITIONS | | | | | | |
| PPE, 0.46 IV | 15 | 15 | 15 | 15 | 15 | 15 |
| SEBS G1650 | 10 | 10 | 10 | 10 | 10 | 10 |
| POE 8210 | 20 | 20 | 20 | 20 | 20 | 15 |
| Polybutene | 0 | 0 | 0 | 0 | 0 | 5 |
| POE-MA | 5 | 5 | 5 | 5 | 5 | 5 |
| Mg(OH)$_2$ 5A | 50 | 50 | 50 | 50 | 50 | 50 |
| Antioxidants | 1.1 | 1.1 | 1.1 | 1.1 | 1.1 | 1.1 |
| Erucamide | 1 | 1 | 1 | 1 | 1 | 1 |
| Ca montanate | 0 | 1 | 0 | 0 | 0 | 0 |
| Partially saponified montanate esters | 0 | 0 | 1 | 0 | 0 | 0 |
| Montanate esters | 0 | 0 | 0 | 1 | 0 | 0 |
| PE wax | 0 | 0 | 0 | 0 | 1 | 0 |
| TEST SAMPLE PROPERTIES | | | | | | |
| Melt mass-flow rate (g/10 min) | 12.6 | 14.2 | 13.6 | 13.4 | 16.3 | 19 |
| Flexural modulus (MPa) | 121 | 201 | 173 | 164 | 123 | 71 |
| Shore A hardness | 92 | 92 | 93 | 93 | 93 | 88 |
| Tensile strength at break (MPa) | 8.8 | 7.5 | 8.8 | 9 | 9.5 | 8 |
| Tensile elongation at break (%) | 141 | 124 | 143 | 139 | 163 | 140 |
| WIRE PROPERTIES | | | | | | |
| Tensile Strength (MPa) | 15.2 | 14.5 | 16.2 | 15.8 | 16 | 12.7 |
| Tensile Elongation (%) | 338 | 356 | 363 | 367 | 343 | 324 |
| Flammability, IEC60322-1-1 | Pass | Pass | Pass | Pass | Pass | Pass |
| Burning time after 60 sec fire application (sec) | 0 | 0 | 0 | 4 | 0 | 0 |
| Distance A | 270 | 293 | 260 | 280 | 277 | 265 |
| Distance B | 490 | 493 | 490 | 497 | 492 | 490 |
| Surface appearance | Smooth | Smooth | Smooth | Smooth | Smooth | Smooth |

Examples 21-36

These examples relate to compositions, insulated conductors with insulating layers comprising the compositions, and cable (e.g., H03 cable) with two insulated conductors surrounded by a sheath.

Data for six compositions differing in presence or absence of polybutene, magnesium dihydroxide type and amount, presence or absence of zinc borate and silicone flame retardants, and presence or absence of carbon black are presented in Table 8. Both wire (single conductor+insulation) and cable (two conductors+insulation+sheath) properties were measured. In Table 8, "Light transmittance (%)" refers to the value measured in smoke emission testing according to IEC 61034-1, edition 3.0. For Examples 21 and 22, cable properties including flammability and smoke testing were measured on cable using the respective compositions for both insulation and sheath. For Examples 23 and 24, cable properties including flammability and smoke testing were measured on cable using the Example 23 composition for sheath and the Example 24 composition for insulation. For Examples 25 and 26, cable properties including flammability and smoke testing were measured on cable using the Example 26 composition for insulation and the Example 25 composition for sheath. Example 21, a inventive example in which both insulation and sheath compositions contain about 20 weight percent magnesium dihydroxide, passed the flammability test but exhibited a high smoke density (low light transmittance of 16%). Example 21 illustrates that a composition that may perform adequately as the insulation of an insulated conductor does not necessarily perform adequately when used as both the insulation and sheath of an H03 cable. Example 22, the poly(arylene ether) content is greater in the sheath composition (about 25%) than in the insulation composition (about 15%), and the magnesium dihydroxide content is lower in the sheath composition (about 30%) than in the insulation composition (about 50%). The H03 cable formed from these pairs of examples illustrate desirable flame retardancy (passing the IEC60322-1-1 test) and smoke suppression (light transmittance of 46% and 63%, respectively, in the IEC 61034-1 smoke emission test).

TABLE 8

|  | Ex. 21 (I) | Ex. 22 (I) | Ex. 23 (I) | Ex. 24 (I) | Ex. 25 (I) | Ex. 26 (I) |
|---|---|---|---|---|---|---|
| COMPOSITIONS | | | | | | |
| PPE, 0.46 IV | 30 | 25 | 25 | 15 | 28 | 15 |
| SEBS G1650 | 15 | 10 | 10 | 10 | 12 | 10 |
| POE 8210 | 25 | 20 | 20 | 20 | 20 | 20 |
| Polybutene | 0 | 0 | 8 | 0 | 5 | 0 |
| POE-MA | 5 | 5 | 5 | 5 | 5 | 5 |
| $Mg(OH)_2$ 5A | 20 | 40 | 0 | 0 | 0 | 50 |
| $Mg(OH)_2$ H5IV | 0 | 0 | 30 | 50 | 30 | 0 |
| Zinc borate | 5 | 0 | 0 | 0 | 0 | 0 |
| PHTS | 0 | 0 | 2 | 0 | 0 | 0 |
| Antioxidants | 1.1 | 1.1 | 1.1 | 1.1 | 1.1 | 1.1 |
| Erucamide | 0.2 | 0.2 | 0.2 | 0.2 | 0.2 | 0.2 |
| Carbon black | 0 | 0 | 0.5 | 0.5 | 0.5 | 0.5 |
| TEST SAMPLE PROPERTIES | | | | | | |
| Melt mass-flow rate (g/10 min) | 5.3 | 5.2 | 14.9 | 3.0 | 7.2 | 7.1 |
| Flexural modulus (MPa) | 70 | 137 | 28 | 81 | 40 | 128 |
| Shore A hardness | 91 | 95 | 85 | 91 | 88 | 87 |
| Tensile strength at break (MPa) | 10.4 | 10.7 | 10 | 13 | 11.9 | 8.6 |
| Tensile elongation at break (%) | 175 | 119 | 229 | 173 | 200 | 176 |
| Specific gravity (g/cm$^3$) | — | — | 1.15 | 1.32 | — | — |
| CABLE PROPERTIES | | | | | | |
| Insulation Tensile Strength (MPa) | 19.5 | 19.7 | — | 17.5 | — | 12.9 |
| Insulation Tensile Elongation (%) | 230 | 211 | — | 194 | — | 268 |
| Insulation Tensile Strength after aging (MPa) | 18.8 | 17.4 | — | 17.9 | — | — |
| Insulation Tensile Elongation after aging (%) | 211 | 193 | — | 193 | — | — |
| Sheath Tensile Strength (MPa) | 17 | 14.1 | 9.9 | — | 18.9 | — |
| Sheath Tensile Elongation (%) | 265 | 169 | 240 | — | 227 | — |
| Sheath Tensile Strength after aging (MPa) | 16.2 | 13.7 | 10.7 | — | — | — |
| Sheath Tensile Elongation after aging (%) | 229 | 135 | 225 | — | — | — |
| Flammability, IEC60322-1-1 | pass | fail | pass | | pass | |
| Burning time after 60 sec fire application (sec) | 74 | (burn clamp) | 94 | | 110 | |
| Distance A | 297 | (burn clamp) | 273 | | 247 | |
| Distance B | 500 | 490 | 490 | | 490 | |
| Scratch whitening | no | yes | no | | no | |
| Light transmittance (%) | 16 | 66 | 46 | | 63 | | an inventive example in which both insulation and sheath compositions contain about 40 weight percent magnesium dihydroxide, further illustrates that a composition that may perform adequately as the insulation of an insulated conductor does not necessarily perform adequately when used as both the insulation and sheath of an H03 cable. Specifically, the H03 cable prepared using the Example 22 composition as both insulation and sheath exhibited poor flammability but acceptable smoke density. Examples 23 and 24, and Examples 25 and 26 are pairs of inventive examples in which Data for four compositions differing in poly(arylene ether) intrinsic viscosity and amount, unfunctionalized block copolymer type and amount, unfunctionalized polyolefin type and amount, magnesium dihydroxide type and amount, and carbon black amount are summarized in Table 9. For Examples 27 and 28, cable flammability testing was conducted on a cable using the Example 28 composition for insulation and the Example 27 composition for sheath. For Examples 29 and 30, cable flammability testing was conducted on a cable using the Example 30 composition for insulation and the Example 29 composition for sheath. The results further illustrate the advantages of using different compositions for the insulation and sheath of an H03 cable.

TABLE 9

|  | Ex. 27 (I) | Ex. 28 (I) | Ex. 29 (I) | Ex. 30 (I) |
|---|---|---|---|---|
| COMPOSITIONS | | | | |
| PPE, 0.46 IV | 0 | 15 | 0 | 15 |
| PPE, 0.40 IV | 26 | 0 | 26 | 0 |
| SEBS 1650 | 10 | 10 | 12 | 10 |
| SEBS 1651 | 4 | 0 | 0 | 0 |
| POE 8210 | 17 | 20 | 19 | 17 |
| LLDPE | 3 | 0 | 3 | 3 |
| Polybutene | 5 | 0 | 5 | 0 |
| POE-MA | 5 | 5 | 5 | 5 |
| $Mg(OH)_2$ 5A | 0 | 50 | 0 | 50 |
| $Mg(OH)_2$ H5IV | 30 | 0 | 30 | 0 |
| Antioxidants | 1.1 | 1.1 | 1.1 | 1.1 |
| Erucamide | 0.5 | 0.5 | 0.5 | 0.5 |
| Carbon black | 0.5 | 0 | 0.5 | 0 |
| TEST SAMPLE PROPERTIES | | | | |
| Melt mass-flow rate (g/10 min) | 4 | 9.8 | 12.3 | 8.6 |
| Flexural modulus (MPa) | 47 | 144 | 45 | 184 |
| Shore A hardness | 88 | 93 | 88 | 94 |
| Tensile strength at break (MPa) | 10.1 | 7.9 | 10.7 | 8.7 |
| Tensile elongation at break (%) | 139 | 128 | 200 | 121 |
| Specific gravity (g/cm$^3$) | 1.16 | 1.32 | 1.16 | 1.33 |
| CABLE PROPERTIES | | | | |
| Insulation Tensile Strength (MPa) | — | 15.7 | — | 14.6 |
| Insulation Tensile Elongation (%) | — | 356 | — | 314 |
| Insulation Tensile Strength after aging (MPa) | — | 14.8 | — | — |
| Insulation Tensile Elongation after aging (%) | — | 317 | — | — |
| Sheath Tensile Strength (MPa) | 20.2 | — | 18.6 | — |
| Sheath Tensile Elongation (%) | 238 | — | 235 | — |
| Sheath Tensile Strength after aging (MPa) | 20.1 | — | — | — |
| Sheath Tensile Elongation after aging (%) | 211 | — | — | — |
| Flammability, IEC60322-1-1 | pass | | pass | |
| Burning time after 60 sec fire application (sec) | 129 | | 126 | |
| Distance A | 255 | | 160 | |
| Distance B | 495 | | 490 | |
| Light transmittance (%) | >60% | | >60% | |
| Scratch whitening | no | | no | |

Data for six compositions differing in unfunctionalized hydrogenated block copolymer type and amount, functionalized polyolefin type, and magnesium dihydroxide amount are summarized in Table 10. Cable properties were determined using the respective compositions as sheath composition and using the Example 28 composition as insulation composition. Example 31, a comparative example, illustrates the importance of unfunctionalized hydrogenated block copolymer molecular weight. Compared to inventive Example 33, Example 31, which incorporates a high molecular weight hydrogenated block copolymer, exhibits poorer melt flow and tensile strength at break. Example 32, another comparative example, illustrates the importance of hydrogenated triblock copolymer amount. Example 32 contains a hydrogenated block copolymer that contains 70% diblock and 30% triblock. Compared to inventive Example 33, Example 32 was difficult to handle because of its stickiness, and it also exhibited poorer tensile strength at break and tensile elongation at break. Example 36 is a comparative example because of its low content of hydrogenated block copolymer. Relative to inventive Example 35, comparative Example 36, exhibits poorer tensile elongation and flammability. Inventive Examples 33-35 all exhibit desirable properties and are particularly suited for use as sheath compositions.

TABLE 10

|  | Ex. 31 (C) | Ex. 32 (C) | Ex. 33 (I) | Ex. 34 (I) | Ex. 35 (I) | Ex. 36 (C) |
|---|---|---|---|---|---|---|
| COMPOSITIONS | | | | | | |
| PPE, 0.46 IV | 28 | 28 | 28 | 28 | 28 | 28 |
| SEBS G1650 | 0 | 0 | 12 | 12 | 12 | 7 |
| SEBS G1641 | 12 | 0 | 0 | 0 | 0 | 0 |
| SEBS 1726 | 0 | 12 | 0 | 0 | 0 | 0 |
| POE 8210 | 20 | 20 | 20 | 20 | 20 | 20 |
| Polybutene | 5 | 5 | 5 | 5 | 5 | 5 |
| POE-MA | 5 | 5 | 5 | 0 | 0 | 0 |
| PP-MA | 0 | 0 | 0 | 5 | 0 | 0 |
| SEBS-MA | 0 | 0 | 0 | 0 | 5 | 5 |
| $Mg(OH)_2$ H5IV | 30 | 30 | 30 | 30 | 30 | 35 |
| Antioxidants | 1.1 | 1.1 | 1.1 | 1.1 | 1.1 | 1.1 |
| Erucamide | 0.5 | 0.5 | 0.5 | 0.5 | 0.5 | 0.5 |
| TEST SAMPLE PROPERTIES | | | | | | |
| Melt mass-flow rate (g/10 min) | 7.6 | (too sticky to measure) | 9.1 | 18.9 | 15.7 | 16.6 |
| Flexural modulus (MPa) | 27 | 42 | 48 | 88 | 54 | 78 |
| Shore A hardness | 82 | 87 | 88 | 91 | 89 | 92 |
| Tensile strength at break (MPa) | 6.9 | 5.7 | 11.3 | 9.6 | 11.5 | 10.2 |

TABLE 10-continued

|  | Ex. 31 (C) | Ex. 32 (C) | Ex. 33 (I) | Ex. 34 (I) | Ex. 35 (I) | Ex. 36 (C) |
|---|---|---|---|---|---|---|
| Tensile elongation at break (%) | 175 | 78 | 163 | 117 | 160 | 98 |
| CABLE PROPERTIES | | | | | | |
| Sheath Tensile Strength (MPa) | — | 9.9 | 20.4 | 18.4 | 19.7 | 17.9 |
| Sheath Tensile Elongation (%) | — | 94 | 203 | 166 | 184 | 137 |
| Flammability, IEC60322-1-1 | — | Pass | Pass | Pass | Pass | Fail |
| Burning time after 60 sec fire application (sec) | — | 81 | 85 | 97 | 98 | Burn Clamp |
| Distance A | — | 300 | 310 | 282 | 263 | |
| Distance B | — | 490 | 490 | 493 | 490 | 490 |

The working examples collectively illustrate that compositions within the scope of the present claims provide reduced smoke generation without significantly compromising physical and flammability properties. The examples further illustrate that cable comprising one or more conductors, an insulation layer, and a sheath layer can exhibit a particularly desirable combination of physical, flammability, and smoke-suppression properties when the insulation layer comprises about 10 to about 35 weight percent of poly(arylene ether), about 8 to about 16 weight percent of unfunctionalized hydrogenated triblock copolymer, about 15 to about 30 weight percent of unfunctionalized polyolefin, and about 40 to about 60 weight percent of magnesium dihydroxide; and the sheath layer comprises about 10 to about 35 weight percent of poly(arylene ether), about 8 to about 16 weight percent of unfunctionalized hydrogenated triblock copolymer, about 15 to about 30 weight percent of unfunctionalized polyolefin, and about 20 to about 40 weight percent of magnesium dihydroxide.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:
1. An insulated conductor, comprising:
a conductor;
an insulating layer surrounding the conductor;
wherein the insulating layer comprises an insulating layer composition comprising
about 10 to about 35 weight percent of a poly(arylene ether);
about 8 to about 16 weight percent of an unfunctionalized hydrogenated triblock copolymer of an alkenyl aromatic compound and a conjugated diene; wherein the unfunctionalized hydrogenated triblock copolymer has a weight average molecular weight less than or equal to 200,000 atomic mass units;
about 15 to about 30 weight percent of an unfunctionalized polyolefin comprising about 14 to about 30 weight percent of an unfunctionalized ethylene-octene copolymer; and
43 to 60 weight percent of a magnesium dihydroxide;
wherein the magnesium dihydroxide layer composition comprises a stearic acid-treated magnesium dihydroxide;
wherein all weight percents are based on the total weight of the insulating layer composition; and
a sheath layer surrounding the insulating layer;
wherein the sheath layer comprises a sheath layer composition comprising about 10 to about 35 weight percent of a poly(arylene ether);
about 8 to about 16 weight percent of an unfunctionalized hydrogenated triblock copolymer of an alkenyl aromatic compound and a conjugated diene; wherein the unfunctionalized hydrogenated triblock copolymer has a weight average molecular weight less than or equal to 200,000 atomic mass units;
about 15 to about 30 weight percent of an unfunctionalized polyolefin comprising about 14 to about 30 weight percent of an unfunctionalized ethylene-octene copolymer; and
about 20 to about 40 weight percent of a magnesium dihydroxide;
wherein the magnesium dihydroxide of the sheath layer composition comprises an amino magnesium dihydroxide;
wherein all weight percents are based on the total weight of the sheath layer composition.
2. The insulated conductor of claim 1, wherein the insulating layer composition further comprises about 2 to about 8 weight percent of an acid-functionalized polyolefin, an acid- functionalized hydrogenated block copolymer of an alkenyl aromatic compound and a conjugated diene, or a combination thereof.

3. The insulated conductor of claim 1, wherein the sheath layer composition further comprises about 2 to about 8 weight percent of an acid-functionalized polyolefin, an acid-functionalized hydrogenated block copolymer of an alkenyl aromatic compound and a conjugated diene, or a combination thereof.

4. The insulated conductor of claim 1, wherein the insulating layer composition comprises
about 10 to about 20 weight percent of the poly(arylene ether);
about 8 to about 13 weight percent of the unfunctionalized hydrogenated triblock copolymer;
about 15 to about 25 weight percent of the unfunctionalized polyolefin; wherein the unfunctionalized polyolefin comprises about 14 to about 21 weight percent of the unfunctionalized ethylene-octene copolymer; and
43 to 56 weight percent of the magnesium dihydroxide.

5. The insulated conductor of claim 4, wherein the unfunctionalized polyolefin of the insulating layer composition further comprises about 1.5 to about 4.5 weight percent of a linear low density polyethylene.

6. The insulated conductor of claim 4, wherein the insulating layer composition further comprises about 3 to about 7 weight percent of an acid-functionalized polyolefin; wherein the acid-functionalized polyolefin comprises a maleic anhydride-functionalized ethylene-octene copolymer.

7. The insulated conductor of claim 1,
wherein the sheath layer composition comprises
about 20 to about 30 weight percent of the poly(arylene ether);
about 9 to about 15 weight percent of the unfunctionalized hydrogenated triblock copolymer; wherein the unfunctionalized hydrogenated triblock copolymer has a weight average molecular weight less than or equal to 200,000 atomic mass units;
about 22 to about 30 weight percent of the unfunctionalized polyolefin;
wherein the unfunctionalized polyolefin comprises about 15 to about 22 weight percent of an unfunctionalized ethylene-octene copolymer; and
about 25 to about 35 weight percent of the magnesium dihydroxide.

8. The insulated conductor of claim 7, wherein the unfunctionalized polyolefin of the sheath layer composition further comprises about 3 to about 7 weight percent of a polybutene and about 1.5 to about 4.5 weight percent of a linear low density polyethylene.

9. The insulated conductor of claim 7, wherein the sheath layer composition further comprises about 3 to about 7 weight percent of an acid-functionalized polyolefin; wherein the acid-functionalized polyolefin comprises a maleic anhydride-functionalized ethylene-octene copolymer.

10. The insulated conductor of claim 1,
wherein the insulating layer composition comprises
about 10 to about 20 weight percent of the poly(arylene ether);
about 8 to about 13 weight percent of the unfunctionalized hydrogenated triblock copolymer;
about 15 to about 25 weight percent of the unfunctionalized polyolefin;
wherein the unfunctionalized polyolefin comprises about 14 to about 21 weight percent of the unfunctionalized ethylene-octene copolymer; and
43 to 56 weight percent of the magnesium dihydroxide; and
wherein the sheath layer composition comprises
about 20 to about 30 weight percent of the poly(arylene ether);
about 9 to about 15 weight percent of the unfunctionalized hydrogenated triblock copolymer; wherein the unfunctionalized hydrogenated triblock copolymer has a weight average molecular weight less than or equal to 200,000 atomic mass units;
about 22 to about 30 weight percent of an unfunctionalized polyolefin;
wherein the unfunctionalized polyolefin comprises about 15 to about 22 weight percent of an unfunctionalized ethylene-octene copolymer; and
about 25 to about 35 weight percent of the magnesium dihydroxide.

11. The insulated conductor of claim 10, wherein the unfunctionalized polyolefin of the insulating layer composition further comprises about 1.5 to about 4.5 weight percent of a linear low density polyethylene.

12. The insulated conductor of claim 10, wherein the insulating layer composition further comprises about 3 to about 7 weight percent of an acid-functionalized polyolefin comprising a maleic anhydride-functionalized ethylene-octene copolymer.

13. The insulated conductor of claim 10, wherein the unfunctionalized polyolefin of the sheath layer composition further comprises about 3 to about 7 weight percent of a polybutene and about 1.5 to about 4.5 weight percent of a linear low density polyethylene.

14. The insulated conductor of claim 10, wherein the sheath layer composition further comprises about 3 to about 7 weight percent of an acid-functionalized polyolefin; wherein the acid-functionalized polyolefin comprises a maleic anhydride-functionalized ethylene-octene copolymer.

* * * * *